(12) United States Patent
Witkowski

(10) Patent No.: US 6,988,816 B2
(45) Date of Patent: Jan. 24, 2006

(54) ENERGY EFFICIENT LIGHTING APPARATUS AND USE THEREOF

(75) Inventor: Ireneusz Witkowski, Winnipeg (CA)

(73) Assignee: Manitoba Hydro-Electric Board, Winnipeg (CA)

( * ) Notice: Subject to any disclaimer, the term of this patent is extended or adjusted under 35 U.S.C. 154(b) by 25 days.

(21) Appl. No.: 10/401,956

(22) Filed: Mar. 31, 2003

(65) Prior Publication Data

US 2003/0198052 A1    Oct. 23, 2003

(30) Foreign Application Priority Data

Apr. 23, 2002   (CA) .................................. 2,383,182

(51) Int. Cl.
     *F21V 7/09*        (2006.01)
(52) U.S. Cl. ..................... 362/297; 362/349; 362/263
(58) Field of Classification Search ................ 362/346, 362/217, 260–261, 298, 301–302, 293, 263, 362/282, 297, 348–350
     See application file for complete search history.

(56) References Cited

U.S. PATENT DOCUMENTS

| | | | |
|---|---|---|---|
| 3,763,348 A * | 10/1973 | Costello | ..................... 392/423 |
| 3,829,677 A | 8/1974 | DeLlano | |
| 4,078,169 A * | 3/1978 | Armstrong | ................. 362/122 |
| 4,123,793 A | 10/1978 | Lilley | |
| 4,242,725 A | 12/1980 | Douma et al. | |
| 4,336,576 A | 6/1982 | Crabtree | |
| 4,388,675 A | 6/1983 | Lewin | |
| 4,490,184 A | 12/1984 | Forcht et al. | |
| 4,499,529 A | 2/1985 | Figueroa | |
| 4,599,684 A | 7/1986 | Lee | |
| 4,674,016 A | 6/1987 | Gallagher | |
| 4,719,546 A | 1/1988 | Spitz | |
| 5,062,030 A * | 10/1991 | Figueroa | ..................... 362/346 |
| 5,251,064 A | 10/1993 | Tennant et al. | |
| 5,363,295 A * | 11/1994 | DeKleine et al. | ........... 362/346 |
| 5,577,833 A * | 11/1996 | English et al. | .............. 362/297 |
| 5,988,836 A | 11/1999 | Swarens | |
| 6,164,800 A | 12/2000 | McIlwraith | |
| 6,257,735 B1 | 7/2001 | Baar | |

FOREIGN PATENT DOCUMENTS

| | | |
|---|---|---|
| CA | 682592 | 3/1964 |
| CA | 1076086 | 4/1980 |
| CA | 1111818 | 11/1981 |
| CA | 1128482 | 7/1982 |
| CA | 1259975 | 9/1989 |
| CA | 1266850 | 3/1990 |
| CA | 1309451 | 10/1992 |
| CA | 2147628 | 5/1994 |

(Continued)

*Primary Examiner*—Sandra O'Shea
*Assistant Examiner*—Guiyoung Lee
(74) *Attorney, Agent, or Firm*—Ryan W. Dupuis; Adrian D. Battison; Michael R. Williams

(57) ABSTRACT

An apparatus and method are provided for providing substantially uniform illumination. The apparatus includes an elongate reflector housing with an inner surface having a substantially constant profile in cross section which is generally concave, an optical center being defined at a geometric focus of the profile of the inner surface. In a preferred embodiment, substantially uniform illumination is achieved by providing an elongate light source positioned within the elongate reflector housing such that a geometric center of the light source is situated preferably spaced outwardly from the optical center of the housing, away from the inner surface of the housing.

27 Claims, 32 Drawing Sheets

FOREIGN PATENT DOCUMENTS

| | | |
|---|---|---|
| CA | 2099293 | 9/1994 |
| CA | 2147106 | 10/1995 |
| CA | 2160598 | 5/1996 |
| CA | 2177634 | 7/1997 |
| CA | 2193787 | 6/1998 |
| CA | 2297875 | 8/2001 |

* cited by examiner

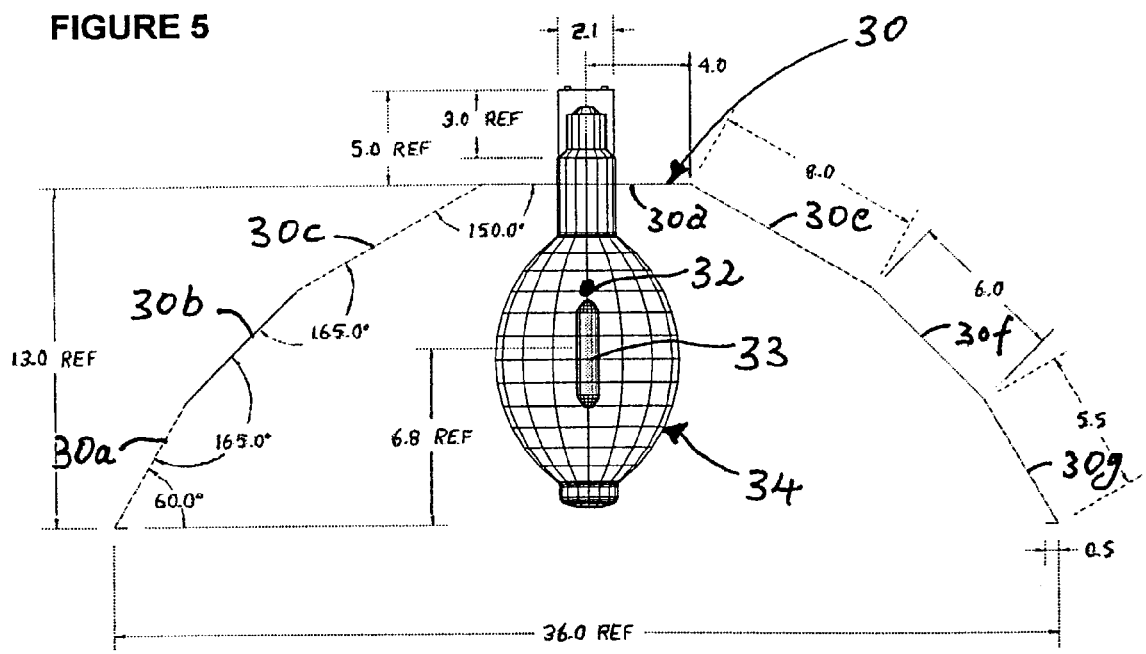

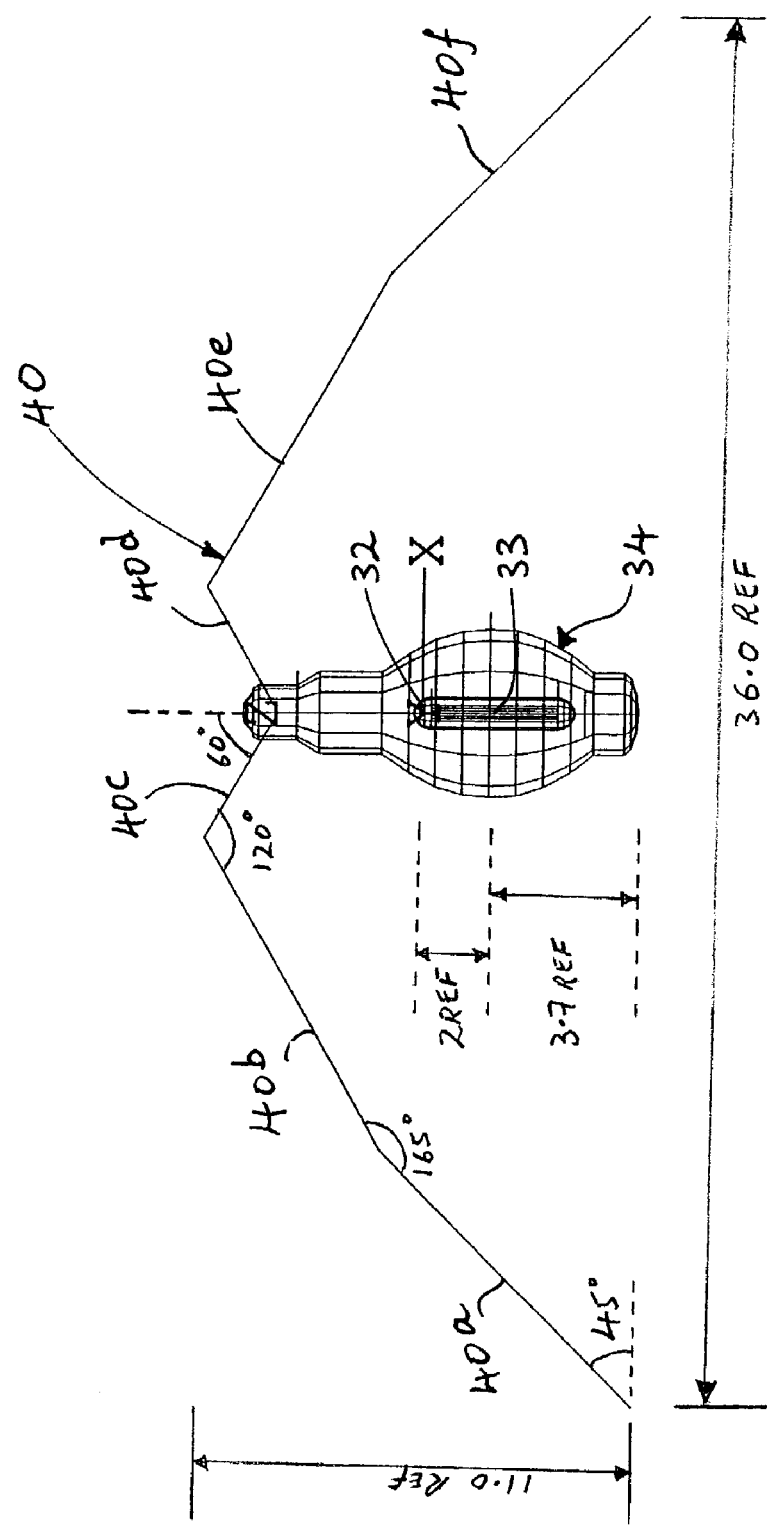

FIGURE 9
A.
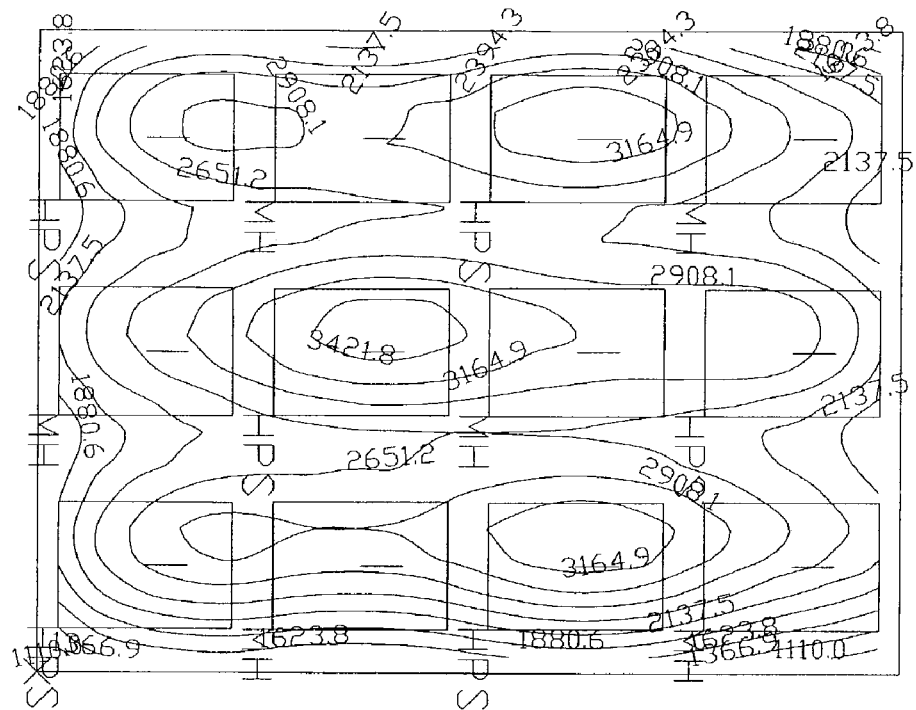
B.
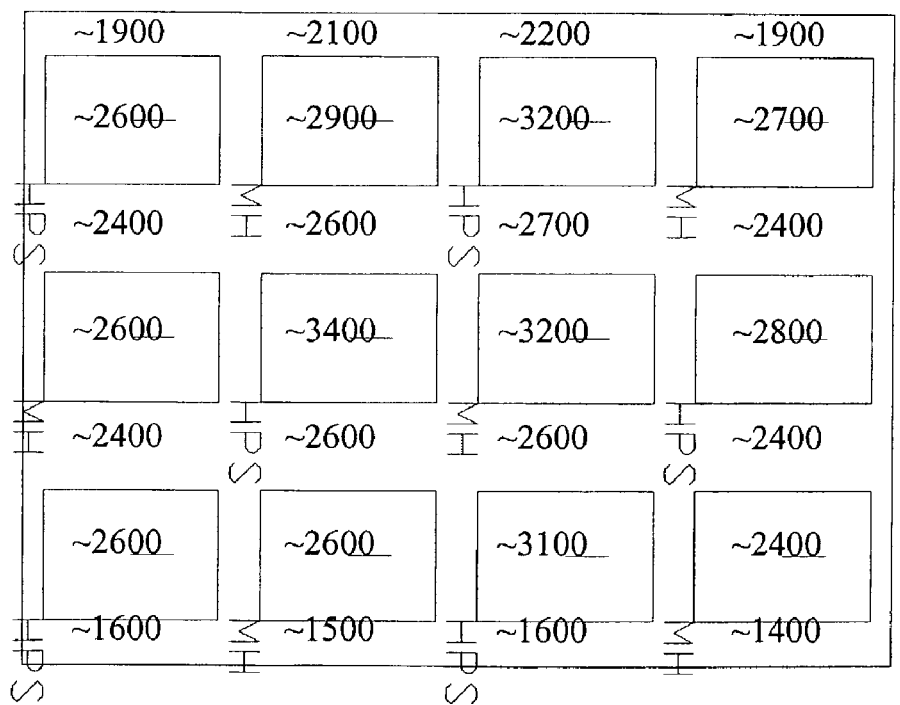

FIGURE 10
A.
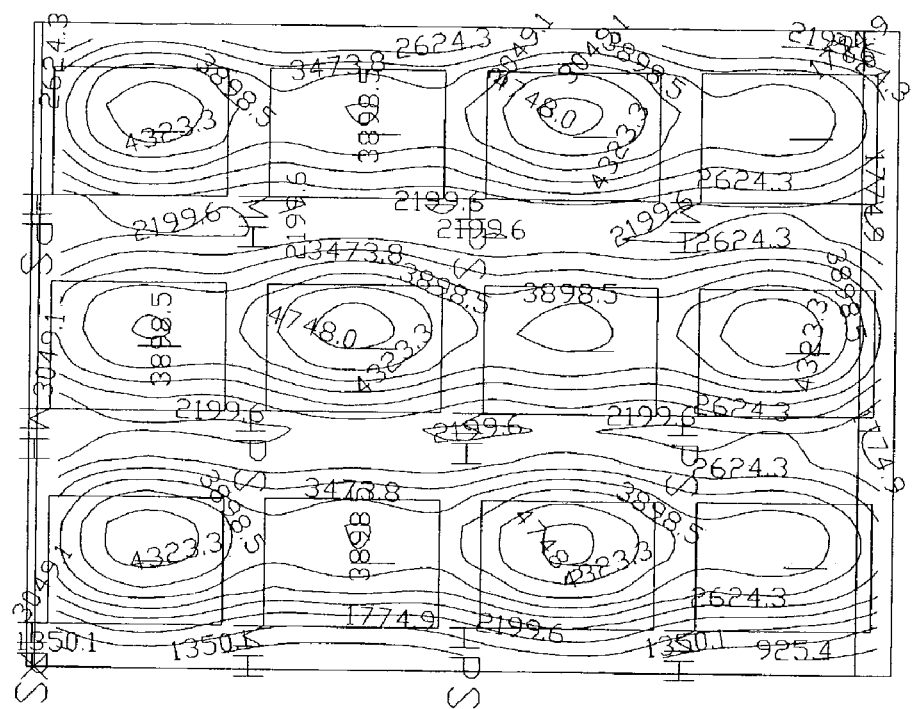
B.
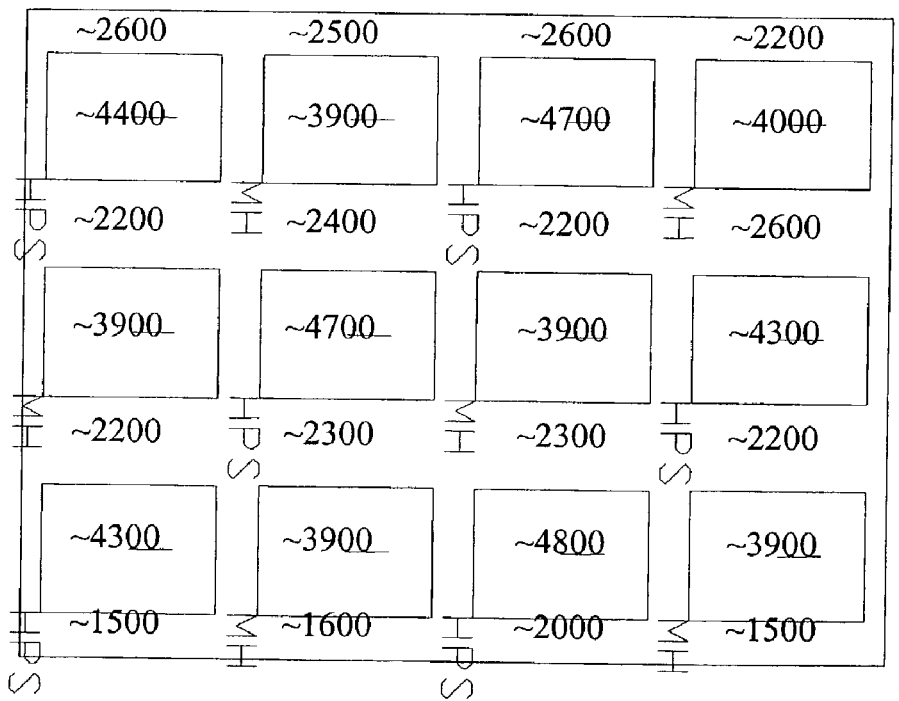

ENERGY EFFICIENT LIGHTING APPARATUS AND USE THEREOF

FIELD OF THE INVENTION

The present invention relates to lighting and illumination devices and more particularly to a method of use thereof for uniform lighting.

BACKGROUND

Light sources and lamp types are commonly characterized and compared by their ability to translate electrical power into usable visible light. The efficiency or efficacy of a lighting system can be measured as the amount of light emitted (in Lumens) divided by the amount of electricity used (in Watts). The quality of light is often considered with respect to the colour of light emissions in terms of chromaticity or correlated color temperature, which described the color or wavelength of light emitted from the lighting system measured in Kelvin, and color rendering index (CRI), which indicates the lighting system's ability to show colors naturally (e.g. of an object) measured in percentage.

There exist a diverse variety of light sources which vary widely in their construction, efficiency, color characteristics, and lamp life. In general, a low color temperature corresponds to a red-to-yellow appearance like incandescent lamps (2700K) while white light emitted from fluorescent lamps operating at 4100K. Daylight and some incandescent lighting have a CRI of 100%, while fluorescent applications typically exhibit a CRI of 60%–70% while high intensity discharge (HID) sources are available with CRI ratings at or above 95%.

Incandescent lamps are the most familiar type of light source which produces light by using electric current to heat a metallic filament to a high temperature in a glass bulb filled with inert gas at low pressure. Advantages of incandescent lamps include low initial cost of purchase and good color qualities, optical control and versatility. However, standard Incandescent lights are the most inefficient and expensive to operate and have relatively short lamp lives. A halogen light source is a sub-type of incandescent lamps which includes a halogen element is in the filler gas and the bulb is normally made of quartz glass to withstand higher operating temperatures. Halogen lamps are considerably more expensive than standard incandescence and are primarily used in commercial applications A fluorescent light source is a low-pressure mercury electric discharge lamp consisting of a glass tube filled with argon gas and mercury vapour. When current flows through the ionized gas between the electrodes, it emits ultraviolet radiation from the mercury arc which in turn is converted to visible light by fluorescent coating on the inside of the tube. Fluorescent light sources cost more and are less versatile than incandescence, but they are three to four times more efficient and last about 10 times longer than incandescence.

The three most common HID light sources are mercury vapour, metal halide, high pressure and low pressure sodium light sources and they vary in their construction, efficiency, color characteristics, and lamp life. In general, they all use an electric arc to produce intense light at relatively high efficiency and long service lives and HID lamps can save up 90% of lighting energy when used in lieu of incandescent lamps.

Mercury vapour lighting is the oldest type of HID lighting. Similar to the fluorescent lamps, a mercury vapour or mercury lamp produces light by passing current through the mercury vapour at pressure relatively higher than that in fluorescent lamps. Like all HID sources, mercury lamps consist of an arc tube enclosed in an outer bulb. Mercury vapor lights provide a very cool blue/green white light.

Metal halide lamps are generally similar in construction to the mercury lamps and the main difference is that the arc tube contains metallic salts (scandium and sodium) in addition to the mercury vapour and argon gas which results in higher light output, more lumens per watt, and better color rendition than mercury vapour lights. Metal halide lamps provide the best white light quality of the HIDs and has a high efficiency rating which is somewhere between 50% and 60% that of a comparable high pressure sodium system.

High pressure sodium systems provide high efficiency, lumen maintenance, and greater component life than traditional metal halide systems, but similar to mercury vapor. Conversely, high pressure sodium systems exhibit only modest color quality (distinctly golden-white) and the CRI of these systems is substantially (over three-fold) less than metal halide and closer to that of mercury vapor lamps. Low pressure sodium lamps are the most efficient light source currently available but they produce a monochromatic light and renders a yellow appearance on illuminated objects. Such lighting is preferably used where color rendering is not important.

In essence, incandescent lamps have low efficiency but very high CRI, low pressure sodium lamps have the highest efficiency values and the lowest CRI, and fluorescent and metal halide lamps exhibit moderately high efficiency and CRI.

Elongated fluorescent light fixtures and reflectors have been commonly used to provide illumination for diverse purposes. Conventionally, rectangular, dome- and arch-shaped light reflector fixtures with a cross section resembling of a conic section, have been used to house one or multiple light source(s) as exemplified in Stotter in Canadian Patent No. 682,592; Armstrong U.S. Pat. No. 4,078,169; Tickner in Canadian Patent No. 2,099,293; Swarens in U.S. Pat. No. 5,988,836; Baar in U.S. Pat. No. 6,257,735; Ruud and Lewin in Canadian Patent No. 1,076,086; Hernandez in Canadian Patent No. 1,128,482; Heider and Gurel in Canadian Patent No. 1,309,451; Shemitz in Canadian Patent No. 2,147,106; Nielson et al. in Canadian Patent Application No. 2,160,598; and Raby and Raby in Canadian Patent Application No. 2,193,787.

Acknowledging the inherent inefficiency of the above traditional light fixtures in respect of light energy loss in the area between the light source and the top surface of the light reflector, Lewin in U.S. Pat. No. 4,388,675 and Lee in U.S. Pat. No. 4,599,684 and Canadian Patent No. 1,266,850 have developed the concept of adding one or more elongated channel(s) or rib integral(s) each with a substantially V-shaped cross section to the top surface of the more conventional rectangular light housings, while DeLlano in U.S. Pat. No. 3,829,677; Douma and Brugham in U.S. Pat. No. 4,242,725; Figueroa in U.S. Pat. No. 4,499,529; Gallagher in U.S. Pat. No. 4,674,016 and Canadian Patent No. 1,259,975; Ruud and Lewin in Canadian Patent No. 1,111,818; Grenga and Eannarino in Canadian Patent Application No. 2,147,628; and Stanton & Wasney in Canadian Patent Application No. 2,297,875 essentially all taught the simple incorporation of substantially a V-shape channel or rib integral into each generally shaped parabolic reflector in a manner that said V-shaped channel is incorporated substantially at the vertex (the apex) of the parabola shaped cross section extending longitudinally along the length of the reflector with the bottom of said V-shaped channel extruding towards and running parallel the light source.

For the purpose herein, the optical center of a parabola or of any other conic section shall mean the focus of same which is a point on the principal axis of the conic section on which incident rays parallel to the principal axis either converge towards, or appear to be diverging from. The principal axis is in turn the line that passes through the vertex and the center of curvature, and is perpendicular to the focal plane. The directrix of a conic section is a line which in conjunction with the focus serve to define the conic section in that the shortest distance between any given point on the conic section and the focus is proportional to the shortest distance between said point on the conic section and the directrix. The above ratio is one if the conic is a parabola, the ratio is less than one if the conic is an ellipse, and the ratio is greater than one if the conic is a hyperbola. For greater certainty, more detailed information on conic sections can be found in Yates, R. C. "Conics." *A Handbook on Curves and Their Properties*. Ann Arbor, Mich.: J. W. Edwards, pp. 36–56, 1952; Salmon, G. *Conic Sections, 6th ed.* New York: Chelsea, 1960; Sommerville, D. M. Y. *Analytical Conics, 3rd ed.* London: G. Bell and Sons, 1961; Eves, H. "The Focus-Directrix Property." §6.8 in *A Survey of Geometry, rev. ed.* Boston, Mass.: Allyn & Bacon, pp. 272–275, 1965; Coxeter, H. S. M. and Greitzer, S. L. *Geometry Revisited*. Washington, D.C.: Math. Assoc. Amer., pp. 141–144, 1967; Downs, J. W. *Practical Conic Sections*. Palo Alto, Calif.: Dale Seymour, 1993; and Hilbert, D. and Cohn-Vossen, S. *Geometry and the Imagination*. New York: Chelsea, 1999.

It should be noted that the light source, in each case, has been taught to be positioned virtually directly adjacent either to the vertex of the cross section of the reflector or to the V-shaped rib integral so that it can be substantially at the optical center of the reflector. For instance, Spitz in U.S. Pat. No. 4,719,546 teaches a fluorescent lighting conversion apparatus to enable the elimination of at least one of multiple fluorescent tubes from conventional fluorescent lighting systems and specifically teaches that the longitudinally axis of the remaining fluorescent tube must be positioned substantially in the upper half of the downward facing elongated reflector means. Furthermore, the length of the elongated light source in each case spans substantially the full length of the elongated reflector.

More recent advancements in the field are to further the efficiency of light reflectors by using increasingly reflective materials for lining the interior surface of light fixtures so to maximize expulsion of light from the fixture thereby reducing light energy loss through absorption by the reflector. For example, Crabtree in U.S. Pat. No. 4,336,576 and Spitz in U.S. Pat. No. 4,719,546 taught fluorescent lighting conversion apparati using mirror surfaces to enable the elimination of at least one of multiple fluorescent tubes that are otherwise required to be used in conventional fluorescent lighting systems. McIlwraith in U.S. Pat. No. 6,164,800 and Canadian Patent No. 2,177,634 taught the coating of light fixtures components such as parabolic louvers with metal substrates with optically useful reflective properties. Raby and Raby in Canadian Application Patent No. 2,193,787; Forcht and Thomas in U.S. Pat. No. 4,490,184; and Tennant and Hood in U.S. Pat. No. 5,251,064 taught the use of metal-incorporated and metalized plastic films with high reflectance for lining lighting fixture reflectors.

While all of the above conventional elongated light reflectors with a parabolic cross section incorporating the V-shaped channels and increasingly reflective materials can be used to reduce primary light "trapping" and energy loss within the area between the light source and the vertex (e.g. the "roof" of parabola) of the reflector, the prior inventors neither addressed nor remedied the impact of the addition of such channels on the direction or spread of distribution, and more importantly the uniformity, of the light emitted from said parabolic fixtures.

In other words, while incorporation of a centrally disposed V-shaped channel can minimize the reflection of light directly back onto the light source (thus reducing wastage), the V-shaped channel now redirects this additional light energy (that is otherwise wasted) to exit the lighting apparatus via either side of the light source thereby invariably providing extra illumination and creating as a side effect uneven illumination usually manifested as two parallel ovoid "hot-spots" sandwiching a central darker area.

Further, none of the above prior art citations teaches specific methods to optimize the positioning of multiple light fixtures, each incorporating a centrally disposed V-shaped channel for efficiency purposes, to maximize the quality and uniformity of light emissions in a cost-effective manner for a given purpose of use or application requiring same for large target areas.

SUMMARY OF THE INVENTION

An object of the invention is to provide improved energy-efficient lighting apparati to maximize the energy efficiency, distribution and uniformity of light emissions from light sources.

Another object of the invention is to teach novel methods of positioning of multiple improved lighting apparati of the present invention to form improved lighting arrays for providing efficient and uniform lighting across large target areas requiring illumination.

Yet another object of the present invention is to provide methods and applications for the use of the improved energy-efficient lighting apparati and improved lighting arrays of the present invention.

According to a first aspect of the present invention there is provided a lighting apparatus for providing substantially uniform light distribution, the apparatus comprising:

an elongate reflector housing with an inner surface having a substantially constant profile in cross section which is generally concave, an optical center being defined at a geometric focus of the profile of the inner surface; and at least one light source positioned within the elongate reflector housing, said at least one light source having a geometric center situated generally at the optical center or spaced outwardly from the optical center in a direction away from the inner surface of the elongate reflector housing.

According to a second aspect of the present invention there is provided a lighting apparatus for providing substantially uniform light distribution, the apparatus comprising:

an elongate reflector housing with an inner surface having a substantially constant profile in cross section which is generally concave, an optical center being defined at a geometric focus of the profile of the inner surface;

and an elongate light source positioned within the elongate reflector housing such that a longitudinal axis of the light source lies perpendicular to a longitudinal direction of the housing and extends through or below the optical center of the housing.

In one embodiment, a geometric center of the light source is preferably positioned at or spaced outwardly from the optical center of the housing, away from the inner surface of the housing.

The optical center is preferably situated on a principal axis of symmetry of the cross section of the housing at a point upon which rays lying parallel to the principle axis of symmetry converge when reflected on the inner surface of the reflector housing.

The light source is preferably centered laterally within the reflector housing.

The housing may include a rib member extending in a longitudinal direction of the housing and projecting from the inner surface of the housing, the rib being generally V-shaped in cross section.

The light source may be elongate and oriented to extend in a longitudinal direction of the housing substantially parallel to the housing. In this instance, the housing preferably extends in the longitudinal direction multiple times a length of the light source.

The light source may alternatively be elongate and oriented to extend generally perpendicular to a longitudinal direction of the housing.

The generally concave interior surface of the housing may be formed of a plurality of sequentially adjacent elongate rectangular sections, each section being oriented at an obtuse angle relative to respective adjacent sections.

An outer periphery of the light source may also be spaced outwardly from the optical center of the housing.

When the housing includes a longitudinally extending base and a pair of opposing sides spanning from the base to respective free ends thereof, the geometric center of the light source may be spaced outwardly beyond the optical center of the housing a distance of between approximately 7 percent and 60 percent of a depth of the housing between the base and the free ends thereof. Preferably, the geometric center of the light source is spaced outwardly beyond the optical center of the housing a distance of between approximately 15 percent and 50 percent of a depth of the housing between the base and the free ends thereof.

The profile of the inner surface in cross section may be substantially a section of an ellipse, a circle, a parabola or a hyperbola. Alternatively, the light source may be generally tubular or ovoid in shape depending upon particular applications and desired output characteristics.

The housing may extend longitudinally between respective open ends thereof or may be capped by suitable upright, curved or inclined capping members.

The housing includes a longitudinally extending base and a pair of opposing sides spanning from the base to respective free ends thereof, the light source being contained within a boundary of the housing defined between the base and the free ends of the housing.

According to a further aspect of the present invention there is provided a method of providing substantially uniform illumination comprising:

providing at least one elongate reflector housing, said at least one housing including an inner surface having a substantially constant profile in cross section which is generally concave, an optical center being defined at a geometric focus of the profile of the inner surface; and providing at least one light source positioned within said at least one elongate reflector housing, said at least one light source having a geometric center situated generally at the optical center or spaced outwardly from the optical center, away from the inner surface of said at least one elongate reflector housing.

The method preferably includes orienting the housing such that the inner surface generally faces downward above a target illumination area and positioning the light source spaced below the optical center of the housing towards the target illumination area.

When the housing is oriented such that the inner surface generally faces downward above a target illumination area, the method may further include orienting a longitudinal axis of the light source to extend perpendicularly to a longitudinal direction of the housing in an upright orientation.

The housing may be formed and the light source positioned in a manner so as to absorb less than 5 percent, and preferably less than 4 percent, of light emitted from the light source.

The method may be used in horticultural or hydroponics applications, or any other suitable application in which generally uniform lighting characteristics are desired.

When a plurality of the reflector housings are provided, with a light source supported within each reflector housing respectively, the method preferably includes supporting the reflector housings spaced apart from one another in a generally common plane above a target illumination area.

When each light source includes a respective field of light distribution, the light sources are preferably positioned at selected spacings from one another so as to overlap the respective fields of light distribution such that light distribution is substantially constant across the target illumination area.

The light sources preferably overlap one another at a point where light intensity is approximately between three quarters and one quarter, but preferably one half, of maximum light intensity of the field of light distribution as measured at the target illumination area.

Each light source is preferably located a distance of least 2 feet above the target illumination area. A distance of the light sources between approximately 2 feet and 10 feet above the target illumination area is useful, but ideally each light source is located a distance between approximately 3 feet and 6 feet above the target illumination area.

A plurality of light sources may be provided within each reflector housing, the plurality of light sources comprising different types of bulbs.

The light sources may also include different types of bulbs when each light source is supported within a respective housing. The light sources preferably include different types of light sources having differing colour range characteristics. The light sources may include metal halide bulbs and high pressure sodium bulbs used in an alternating configuration within the same array of reflector housings.

According to the present invention, a further aspect relates to improved lighting apparati designed to maximize output, distribution and uniformity of light energy emitted from a horizontally disposed elongated light source thereby efficiently maximizing the usefulness of said elongated light source and minimizing energy consumption required therefor. It is surprisingly discovered by the present inventor that novel positioning of an elongated light source with respect to conventional elongated reflector means, as well as to the improved elongated reflector means described herein, can dramatically improve light distribution in terms of breadth and and uniformity whilst retaining and even further improving the energy efficiency benefits primarily associated with the reflector means design. The elongated light source may be of a tubular or ovoid configuration which in turn may be a fluorescent, incandescent or HID light source. Specific types of elongated HID light source suitable for the present invention are without limitation metal halide light sources, low pressure sodium light sources, mercury vapour light sources, and preferably high pressure sodium light sources.

In one embodiment, the improved lighting apparatus as exemplified comprises an elongated reflector means having two substantially semi-tubular structures angularly adjoined substantially in parallel to each other forming a bi-arcuate cross-sectional configuration in the shape of a conic section having an optical center and a directrix, one or more elongated light source(s) disposed substantially centrally within the elongated reflector means and its length running substantially in parallel with the longitudinal axis of the elongated reflector means and extending along the whole or part of the length of the elongated reflector means; wherein the improvement comprising the disposition of each elongated light source onto the elongated reflector means in a manner that its longitudinal center axis is positioned beyond the optical center of the elongated reflector means away from the directrix. Each semi-tubular structure of the elongated reflector means preferably has a conic shape cross section.

In another embodiment, the improved lighting apparatus as exemplified comprises an elongated reflector means having a substantially semi-tubular structure with a conic shape cross section having an optical center and a directrix, one or more elongated light source(s) disposed substantially centrally within the semi-tubular structure of the elongated reflector means and its length running substantially in parallel with the longitudinal axis of the elongated reflector means and extending along the whole or part of the length of the elongated reflector means, one or more elongated rib integral(s) disposed substantially centrally widthwise and inwardly towards the elongated light source and extending lengthwise along the elongated reflector means substantially above elongated light source(s); wherein the improvement comprising the disposition of each elongated light source onto the elongated reflector means in a manner that its longitudinal center axis is positioned beyond the optical center of the elongated reflector means away from the directrix.

The conic shape cross section of the elongated reflector means of the present invention is preferably and substantially a section of a circle, a section of an ellipse, a section of a parabola, or a section of a hyperbola.

The corresponding elongated reflector means can be constructed by bending a single sheet of a suitably reflective material to form a semi-tubular structure with a conic shape cross section or alternatively can be constructed from adjoining angularly and substantially in parallel at least six substantially flat rectanguloid panels of the suitably reflective material to form a semi-tubular structure with a substantially conic shape cross section.

The positioning of the elongated light source(s) with respect to the elongated reflector means is of central importance in the present invention. In order to maximize efficiency, distribution, as well as uniformity of light emissions from any given elongated light source, each elongated light source should be positioned within the area covered by the elongated reflector means in a manner that the longitudinal center axis of the elongated light source is beyond the optical center or the focus of the conic shape cross section, away from the directrix, of the elongated reflector means. Preferably, the longitudinal center axis of each elongated light source is disposed beyond the optical center of the elongated reflector means at a distance of at least about 15 percent of the height of the elongated reflector means and said longitudinal center axis should however remain within the area covered by the elongated reflector means. With respect to the length of each elongated light source, each elongated light source may extend longitudinally along the entire or part length of the elongated reflector means. In the event that a single elongated light source which extends only part of the length of the elongated reflector means is used, it is preferred that such an elongated light source be positioned substantially centrally at mid-length of the elongated reflector means for optimal control of light distribution and uniformity.

For apparati comprising one or more elongated rib integral(s) disposed on the interior surface of the elongated reflector means, the length of each elongated rib integral may extend along the entire or part of the length of the elongated reflector means as long as the length and positioning of each elongated rib integral should at least be commensurate with the length and positioning of each elongated light source.

Another aspect of the present invention relates to improved lighting apparati designed to maximize output, distribution and uniformity of light energy emitted from a substantially perpendicularly or vertically disposed elongated light source thereby efficiently maximizing the usefulness of said elongated light source and minimizing energy consumption required therefor. The elongated light source may again be of a tubular or ovoid configuration which in turn may be a fluorescent, incandescent or HID light source. Specific types of elongated HID light source suitable for the present invention are without limitation low pressure sodium light sources, high pressure sodium light sources, mercury vapour light sources, and preferably metal halide light sources.

In an embodiment, the improved lighting apparatus as exemplified comprises an elongated reflector means having a substantially semi-tubular structure with a conic shape cross section to provide an optical center, one or more elongated light source(s) disposed substantially centrally across the width of the elongated reflector means, wherein the improvement comprising the disposition of each elongated light source in a substantially perpendicular manner in relation to the plane of the panel of the elongated reflector means to which the elongated light source is attached. In circumstances where an elongated reflector means with a substantially V-shaped central rib integral is used, the elongated light source is disposed in a substantially perpendicular manner with respect to the longitudinal axis of the elongated reflector means and to the directrix of the conic cross section of the elongated reflector means.

For the present invention, the conic shape cross section of the elongated reflector means is preferably and substantially a section of a circle, a section of an ellipse, a section of a parabola, or a section of a hyperbola. The elongated reflector means can again be constructed by bending a single sheet of a suitably reflective material to form a semi-tubular structure with a conic shape cross section or alternatively can be constructed from adjoining angularly and substantially in parallel at least five substantially flat rectanguloid panels of the suitably reflective material to form a semi-tubular structure with a substantially conic shape cross section.

Subject to the size and shape of the elongated light source in relation to the elongated reflector means, each elongated light source may be disposed onto the elongated reflector means in a manner that its geometric center is at the optical center or beyond the optical center of and away from the directrix of the elongated reflector means.

In another embodiment, the improved lighting apparatus as exemplified herein may optionally include one or more elongated rib integral(s) disposed substantially centrally widthwise and the apex or ridge of each elongated rib integral orienting inwardly towards the elongated light source and extending lengthwise along the elongated reflector means. The length of each elongated rib integral may extend longitudinally along the entire length of the elongated reflector means or part of the length of the elongated reflector means provided that the length and positioning of each elongated rib integral should at least be commensurate with the length and positioning of each elongated light source.

Preferably, the elongated light source in this embodiment should be positioned in a manner with respect to the elongated reflector means so that the geometric center of the elongated light source is beyond the optical center of the elongated reflector means away from the directrix of the conic shape cross section. For example, the geometric center of the elongated light source is disposed beyond the optical center of the elongated reflector means at a distance of at least about 7 percent to about 60 percent of the height of the elongated reflector means and the geometric center of the elongated light source should however remain within the area covered by the elongated reflector means.

In another aspect of the present invention, the inventors contemplate improved lighting arrays each comprising an array of multiple improved lighting apparati of the present invention so positioned with respect to each other to provide uniform and energy-efficient lighting for a large target area. As a result of the improved efficiency of the individual improved lighting apparati of the present invention in terms of their optimized light output and distribution, fewer units of the present improved lighting apparati would be required to illuminate a given area as compared to the number otherwise required if conventional lighting apparati in the prior art are used.

In one embodiment, multiple improved lighting apparati of the present invention each having the same type of elongated light source are arranged in series and/or in parallel to form an improved lighting array for providing uniform and energy-efficient illumination of a single set of light qualities for a large target area. Preferably, the multiple improved lighting apparati should be arranged adjacent to each other having similar distance and orientation towards the target object or area requiring illumination.

In another embodiment, multiple improved lighting apparati of the present invention comprising more than one type of elongated light source are arranged in series and/or in parallel to form an improved lighting array capable of providing uniform and energy-efficient illumination with mixed light qualities for a large target area.

For example, each improved lighting apparatus may comprise more than one type of elongated light source, or alternatively, different improved lighting apparati may contain different types of elongated light source depending on the application and the light qualities required.

In a further aspect, the present invention provides energy-efficient methods of using the improved lighting apparati and improved lighting arrays of the present invention for applications requiring energy-efficient and uniform lighting, and preferably, applications demanding illumination of high light intensity and uniformity at relatively close range or low mounting height.

One embodiment of this aspect of the present invention provides a method of using the presently improved lighting apparati or improved lighting arrays for horticulture or hydroponics. For the present purpose, horticulture and hydroponics shall include without limitation the propagation, growth, breeding, production and engineering of plants and other light-dependent organisms such as certain protists, which may include garden plants, vegetables, herbs, flowers, crops trees and a variety of recombinant hosts.

None of the aforementioned light sources can reproduce the light qualities and spectrum of sunlight and different light sources provide illumination with different light qualities that differently affect the physiological development, growth and maturation of plants. For instance, standard fluorescent light sources facilitate prompt and uniform seed germination but is slow in promoting plant flowering, while incandescent-mercury light sources promotes rapid flowering but inhibits seed germination. Metal halide light sources has a CRI index of about 65% and is very rich in the blue and green colours which are useful attributes for inducing and maintaining plant flowering over a long period of time. By comparison, high pressure sodium light sources has a 22% CRI and is richer in the red and yellow region which delay plant flowering.

It is therefore suggested by the inventor that the improved lighting arrays of the present invention may uniformly comprise of more than one type of elongated light source so to maximize the diversity of light qualities that are required by plants at different stages of development. Further, in order to maximize energy-efficiency, horticulturists may tailor and selectively activate one or more specific type(s) of elongated light sources within a given improved lighting array to provide illumination with certain light qualities for plants at a given stage of development, then selectively activate a different type(s) of elongated light sources within the same improved lighting array (while deactivating the first set) to provide illumination with different light qualities that may become required when said plants enter into the next development stage. To minimize the impact of the on/off cycles on the overall distribution of light, the different types of elongated light sources required should be present in every improved lighting apparatus within said array, said different types of elongated light sources preferably disposed as closely as possible to the longitudinal center of each improved lighting apparatus to maximize utility of the elongated reflector means. It should be apparent to a skilled artisan that each improved lighting array should be mounted in a manner so that its height may be adjusted according to plant growth so to maintain a substantially constant mounting distance from the top of the plants.

In other embodiments, the improved lighting apparati or improved lighting systems of the present invention are useful, for example, in certain laboratory or surgical uses where uniform and bright lighting are required and in dairy farming where uniform high intensity lighting in milking areas has been shown to improve milk production.

Other objects, features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

For a more detailed disclosure of the invention and for further objects and advantages thereof, reference is to be had to the following description taken in conjunction with the accompanying drawings, in which:

FIG. 5 is a front elevational view of an improved lighting apparatus of the present invention comprising a perpendicularly disposed elongated ovoid light source.

FIG. 8 is a front elevational view of a variation of the improved lighting apparatus of the present invention comprising a perpendicularly disposed elongated ovoid light source.

FIGS. 9A and 9B are top plan views of a same common improved lighting array comprising a mixture of improved lighting apparati of the present invention mounted at 48" above a target area.

FIGS. 10A and 10B are top plan views of a same common improved lighting array comprising a mixture of improved lighting apparati of the present invention mounted at 24" above a target area.

All of the above noted iso-contour plots include numerical values measured in units of Foot Candles with the light sources at a spacing of 36 inches above the target illumination area. The numerical values in the above noted polar plots are measured in units of Candela.

In each of the iso-contour plots, the dotted line represents a path of constant numerical value of Foot Candles having the lowest magnitude among the numerical values indicated in the accompanying legend. Accordingly, the bold line of each iso-contour plot represents a path of constant numerical value having the greatest magnitude among the values indicated in the accompanying legend. The lines spaced between the dotted line and the bold line are similarly of constant numerical value, increasing in magnitude at sequentially spaced positions from the dotted line to the bold line.

DETAILED DESCRIPTION

Referring to the accompanying figures there is illustrated lighting apparati and designs and arrays thereof to maximize efficiency, distribution and uniformity of light emissions from a given light source thereby maximizing the usefulness of said light source with minimal energy consumption.

One aspect of the present invention relates to improved lighting apparati designed to maximize output, distribution and uniformity of light energy emitted from a horizontally disposed elongated light source thereby efficiently maximizing the usefulness of said elongated light source and minimizing energy consumption required therefor.

Figure 1:
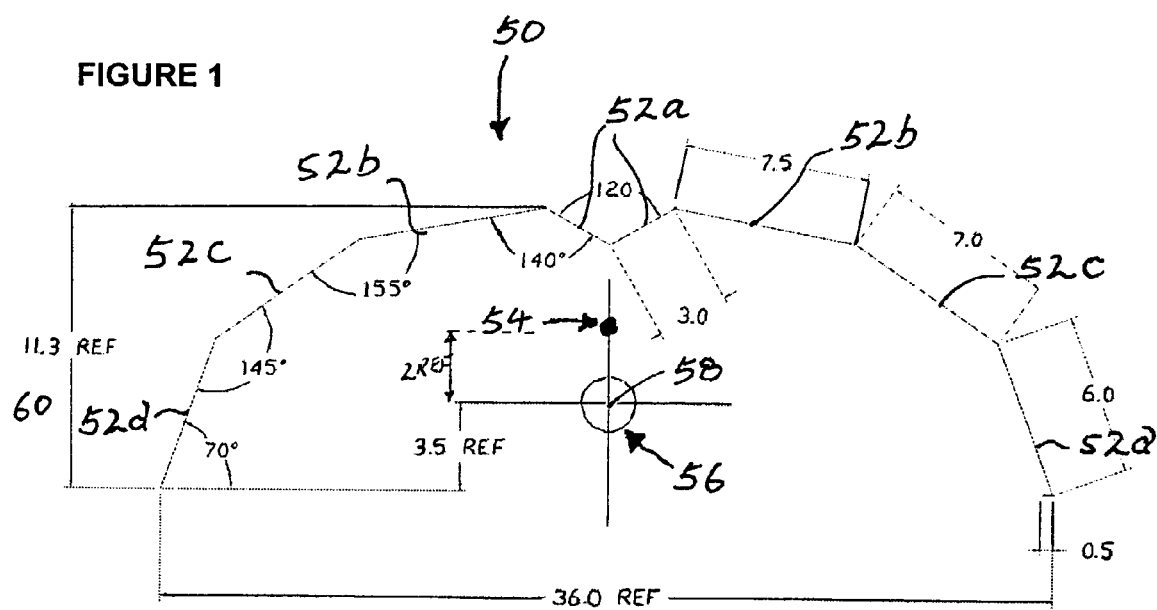
FIG. 1 is a front elevational view of an improved lighting apparatus of the present invention comprising a longitudinally disposed elongated tubular light source.
Figure 3:
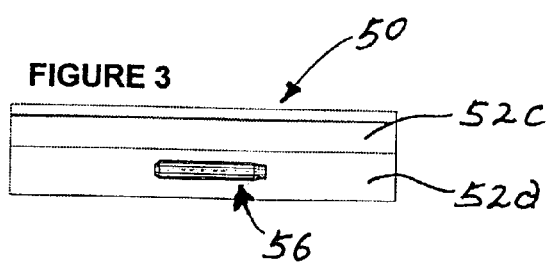
FIG. 3 is a side elevational view of the same improved lighting apparatus comprising a longitudinally disposed elongated tubular light source.
Figure 2:
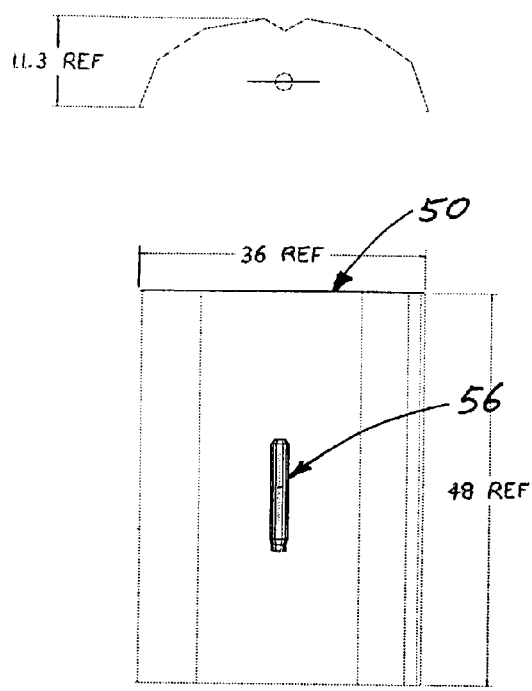
FIG. 2 is a top plan view of the same improved lighting apparatus comprising a longitudinally disposed elongated tubular light source.

Referring initially to FIGS. 1 to 3 herein, a preferred embodiment of the present invention is illustrated as an improved lighting apparatus comprising an elongated reflector means 50 having two substantially semi-tubular structures 52 each with a conic shape cross section angularly adjoined substantially in parallel to each other forming a substantially symmetrical bi-arcuate cross-sectional configuration having an optical center 54. The reflector means generally comprises an elongate housing with an inner surface having a substantially constant profile in cross section which is generally concave, an optical center being defined at a geometric focus of the profile of the inner surface. A constant profile is understood herein to comprise either a smooth curved surface or a surface formed of a plurality of flat surfaces sequentially adjoined with one another, each at an obtuse angle to adjacent ones of the flat surfaces.

In the present illustration, each semi-tubular structures 52 is constructed by bending a single sheet of a suitably reflective material 52 to form 4 substantially flat and parallel panels 52a, 52b, 52c and 52d, or alternatively, by adjoining angularly and substantially in parallel 4 separate substantially flat rectanguloid panels by conventional means such as welding or using threaded fasteners, so to form the semi-tubular structure 52a, 52b, 52c and 52d with a conic shape cross section. The angles of disposition of each rectanguloid panel with respect to each other are evidently set forth in FIG. 1 with the panels 52d that are furthest away from the elongated light source being disposed at an angle of about 70 degrees from the horizontal plane of the elongated reflector means.

Alternatively, the configuration of the above elongated reflector means 50 may be viewed and described to overall comprise a substantially semi-tubular structure with a substantially semi-elliptical shape cross section and a longitudinal V-shape rib integral 2=52a disposed centrally widthwise and inwardly extending lengthwise along the full length of the elongated reflector means. In this instance, the elongated reflector means 50 is formed substantially by the juxtaposition of the substantially flat and parallel panels 52b, 52c and 52d to form an essentially semi-elliptical shape cross section while the rib integral is formed by the angular juxtaposition of the 2 panels 52a to form a V-shape channel.

It should be readily apparent to a person skilled in the art that although the conic shape cross section as illustrated in FIGS. 1 to 3 is substantially elliptical, other conic shape cross sections may be substituted such as a section of a circle, a section of a parabola, or a section of a hyperbola. Correspondingly, the minimum number of bends or rectanguloid panels required would depend on the conic section desired. It should also be apparent that the semi-tubular structures 52 may be formed by roll-bending a single sheet of the suitably reflective material to form curved semi-tubular structures with essentially the same conic shape cross section configuration to achieve the desired functionalities as contemplated by the inventor hereunder.

Figure 4:
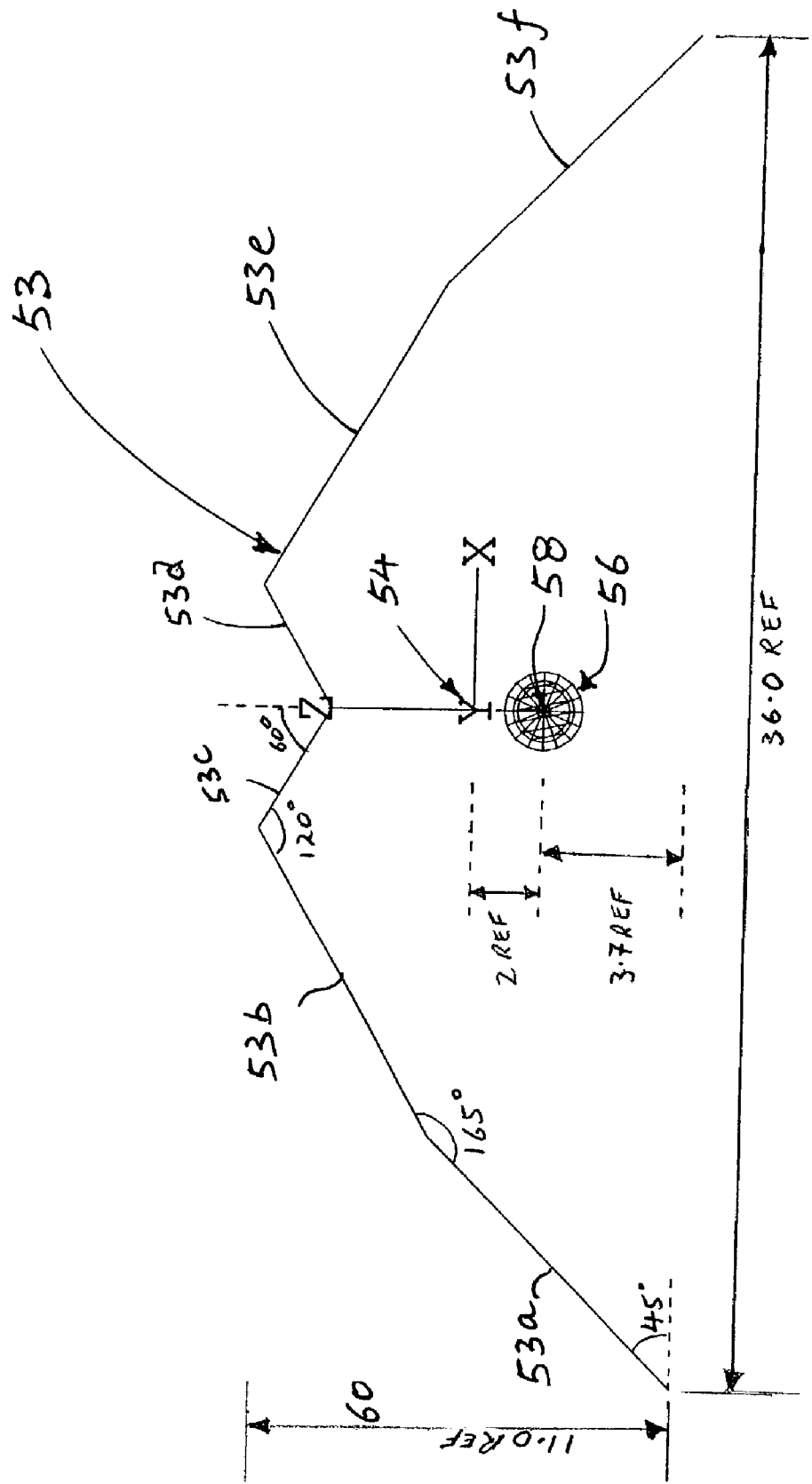
FIG. 4 is a front elevational view of a variation of the improved lighting apparatus of the present invention comprising a longitudinally disposed elongated tubular light source.

For purpose of illustration, a variation of the improved lighting apparati of the present invention is presented in FIG. 4 in which the conic shape cross section 53 of the elongated reflector means is substantially parabolic and a longitudinal V-shape rib integral 53c and 53d is disposed centrally widthwise and inwardly extending lengthwise along the full length of the elongated reflector means. The elongated reflector means herein can be constructed by bending a single sheet of a suitably reflective material to form 6 substantially flat and parallel panels 53a through 53f or alternatively, by adjoining angularly and substantially in parallel 6 separate substantially flat rectanguloid panels by conventional means such as welding or using threaded fasteners, so to form the semi-tubular structure 53a through 53f with a conic shape cross section. The angles of disposition of each rectanguloid panel with respect to each other are evidently set forth in this FIG. 4 with the panels 53a and 53f being disposed at an angle of about 40 degrees from the horizontal plane of the elongated reflector means.

With reference to FIGS. 1 to 3, an elongated tubular light source 56 is illustrated to be disposed substantially centrally widthwise within the elongated reflector means and longitudinally along approximately one-third of the length of said elongated reflector means. As noted above, the longitudinal center axis 58 of said elongated tubular light source 56 is disposed along the elongated reflector means substantially beyond the optical center 54, away from the directrix, of said elongated reflector means. Preferably, the distance between longitudinal center axis 58 and the optical center 54 is at least about 15 percent of the height 60 of the elongated reflector means but should not exceed about 50 percent of height 60 so that the longitudinal center axis 58 remains above the bottom edges of panels 52d and within the area covered by the elongated reflector means. Similarly and referring to FIG. 4, the distance between longitudinal center axis 58 and the optical center 54 is likewise disposed substantially beyond the optical center 54 of said elongated reflector means and that the longitudinal center axis 58 again remains above the bottom edges of panels 53a and 53f and within the area covered by the elongated reflector means.

The elongated light source shown in FIGS. 1 to 4 is a 1000 W 250V S52 high pressure sodium LU1000 lamp with an E-25 clear tubular bulb configuration (ANSI Standard for electric lamps C78.42 (1995): Guidelines for high pressure sodium lamps). However, a skilled artisan should appreciate that other high pressure sodium light sources with different power ratings may be substituted without sacrificing the benefits of the lighting apparati of the present invention, although the total Lumen output per lighting apparatus would be reduced in the event a lower Wattage light source is substituted. Further, other elongated light sources of a tubular or ovoid design may also be suitably and horizontally disposed within the improved lighting apparati of the present invention and examples of same could include fluorescent, incandescent or HID light sources such as metal halide, low pressure sodium, or mercury vapour light sources.

As noted above, the elongated reflector means of the improved lighting apparati of the present invention may be made of any material with high reflectance and offers sufficient strength, rigidity, moldability, heat and corrosion resistance, and durability. In essence, a preferred material should exhibit maximal specular reflection (where the angle between the incident ray and the normal to the surface is equal to the angle between the reflected ray and the normal) and minimal diffuse reflection. The material may be metallic sheets or panels with a mirror finish or film disposed on the interior surface of the elongated reflector means. Preferably, the material is light weight aluminum or other metal alloys with an anodized oxide coating with high reflectance and optionally the addition of a layer of silica or titania by vapour deposition to provide a hard durable surface. For example, the MIRO® anodized lighting sheet produced by Anomet Inc. is such an aluminum-based product capable of reflecting a minimum of 95% of visible light rays emitted by any light source. Other suitable materials such as composites and polymers exhibiting the aforementioned required physical characteristics and a coating system with high reflectance may also be used for the construction of the elongated reflector means.

Another aspect of the present invention relates to improved lighting apparati designed to maximize output, distribution and uniformity of light energy emitted from a substantially perpendicularly or vertically disposed elongated light source thereby efficiently maximizing the usefulness of said elongated light source and minimizing energy consumption required therefor.

Figure 7:
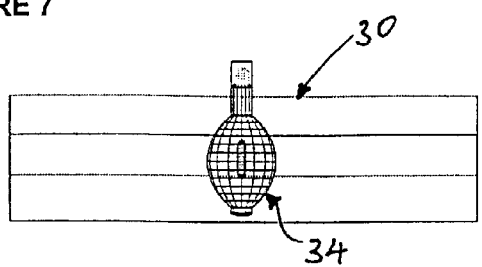
FIG. 7 is a side elevational view of the same improved lighting apparatus comprising a perpendicularly disposed elongated ovoid light source.
Figure 6:
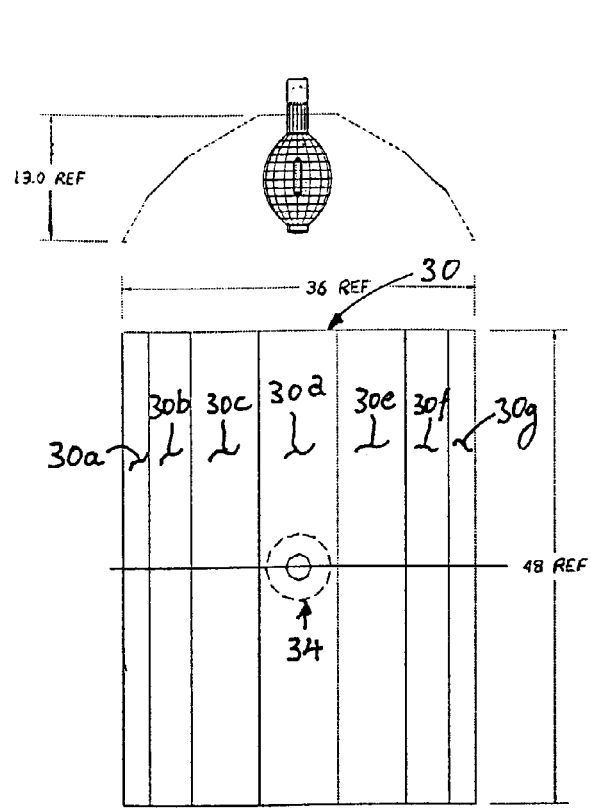
FIG. 6 is a top plan view of the same improved lighting apparatus comprising a perpendicularly disposed elongated ovoid light source.

Referring to FIGS. 5 to 7 herein, an embodiment of this second aspect of the present invention provides an improved lighting apparatus designed to accommodate an elongated light source disposed substantially perpendicularly to the directrix of the conic shape cross section of the elongated reflector means.

Such an improved lighting apparatus as exemplified comprises an elongated reflector means 30 having a substantially semi-tubular structure with a conic shape cross section to provide an optical center 32, an elongated light source 34 disposed substantially centrally across the width of the elongated reflector means 30, wherein the improvement comprising the disposition of said elongated light source 34 in a substantially perpendicular manner in relation to the directrix of the conic shape cross section of the elongated reflector means.

For the purpose herein, the directrix of a conic section is a line which in conjunction with the focus serve to define the conic section in that the shortest distance between any given point on the conic section and the focus is proportional to the shortest distance between said point on the conic section and the directrix. The above ratio is one if the conic is a parabola, the ratio is less than one if the conic is an ellipse, and the ratio is greater than one if the conic is a hyperbola.

In the present embodiment, the elongated light source is disposed substantially centrally widthwise of the elongated reflector means 30, hence said elongated light source is in essence disposed substantially perpendicularly to the surface of the elongated reflector means at its point of attachment to said elongated reflector means.

In the present illustration, the elongated reflector means 30 is constructed by bending a single sheet of a suitably reflective material to form 7 substantially flat and parallel panels 30*a* through 30*g* or alternatively, by adjoining angularly and substantially in parallel 7 separate substantially flat rectanguloid panels by conventional means such as welding or using threaded fasteners, so to form the semi-tubular structure 30*a* through 30*g* with a conic shape cross section. The angles of disposition of each rectanguloid panel with respect to each other are evidently set forth in FIG. 5 with the panels 30*a* and 30*g* that are furthest away from the elongated light source being disposed at an angle of about 60 degrees from the horizontal plane of the elongated reflector means. Further, it should be readily apparent to a person skilled in the art that although the conic shape cross section as illustrated in FIGS. 5 to 7 is substantially parabolic, other conic shape cross sections may be substituted such as a section of a circle, a section of an ellipse, or a section of a hyperbola. Correspondingly, the minimum number of bends or rectanguloid panels required would depend on the conic section desired. It should also be apparent that the semi-tubular structures 12 may be formed by roll-bending a single sheet of the suitably reflective material to form curved semi-tubular structures with essentially the same conic shape cross section configuration to achieve the desired functionalities as contemplated by the inventor hereunder.

For purpose of illustration, a variation of the improved lighting apparati of the present invention is presented in FIG. 8 in which the conic shape cross section 40 of the elongated reflector means is substantially parabolic and a longitudinal V-shape rib integral 42 is disposed centrally widthwise and inwardly extending lengthwise along the full length of the elongated reflector means. The elongated reflector means herein can be constructed by bending a single sheet of a suitably reflective material to form 6 substantially flat and parallel panels 40*a* through 40*f* or alternatively, by adjoining angularly and substantially in parallel 6 separate substantially flat rectanguloid panels by conventional means such as welding or using threaded fasteners, so to form the semi-tubular structure 40*a* through 40*f* with a conic shape cross section. The angles of disposition of each rectanguloid panel with respect to each other are evidently set forth in this FIG. 8 with the panels 40*a* and 40*f* being disposed at an angle of about 40 degrees from the horizontal plane of the elongated reflector means.

With reference to FIGS. 5 to 7, an elongated tubular light source 34 is illustrated to be disposed substantially centrally widthwise and lengthwise within the elongated reflector means and substantially perpendicularly to panel 30*d* which is parallel to the directrix of the conic shape cross section of the elongated reflector means. The geometric center 33 of said elongated tubular light source 34 is disposed beyond the optical center 32, away from the directrix, of said elongated reflector means, although in this instance, the geometric center 33 of said elongated tubular light source 34 may also be disposed close to or at the optical center 32 of said elongated reflector means without having significant adverse impact on the efficiency, distribution or uniformity of the light emissions arising from the perpendicularly disposed elongated tubular light source.

Referring to FIG. 8, the elongated tubular light source 34 is also disposed substantially centrally widthwise and lengthwise within the elongated reflector means and substantially perpendicularly to the directrix of the conic shape cross section of the elongated reflector means, which now includes a longitudinally disposed V-shape rib integral 42 as aforementioned. The geometric center 33 of said elongated tubular light source 34 is again illustrated to be, but preferably in this instance, disposed beyond the optical center 32 away from the directrix of said elongated reflector means. Preferably, the distance between the geometric center 33 and the optical center 32 is about 15 to 60 percent of the height of the elongated reflector means but may be between 7 and 60 percent of height so that the geometric center 33 remains above the bottom edges of panels 40*a* and 40*f* and within the area covered by the elongated reflector means.

The setups in FIGS. 5 to 8 are unconventional and novel as the elongated light sources are each disposed substantially centrally widthwise and lengthwise within the elongated reflector means but in a perpendicular fashion in relation to the directrix of the conic cross section of the elongated reflector means. Conventional setups in the prior art teach the horizontal placement of elongated light sources so to be substantially parallel with the longitudinal axis of elongated reflector means.

The elongated light source shown in FIGS. 5 to 8 is a 1000 W 263V M47 metal halide MH1000 lamp with a BT-37 or BT-56 clear tubular bulb configuration (ANSI Standard for electric lamps C78.1376 (1996): Guidelines for metal halide lamps). However, a skilled artisan should appreciate that other metal halide light sources with different power ratings may be substituted without sacrificing the benefits of the lighting apparati of the present invention, although the total Lumen output per lighting apparatus would be reduced in the event a lower Wattage light source is substituted. Further, other elongated light sources of a tubular or ovoid design may also be suitably and perpendicularly disposed within the improved lighting apparati of the present invention and examples of same could include fluorescent, incandescent or HID light sources such as metal halide, low pressure sodium, or mercury vapour light sources.

As noted above, the elongated reflector means of the improved lighting apparatus of the present invention may preferably be made of a material with high reflectance and offers sufficient strength, rigidity, moldability, heat and corrosion resistance, and durability, such as the MIRO® anodized lighting sheet product produced by Anomet Inc.

It should also be readily apparent to a person skilled in the art that the elongated reflector means as described herein may either be open-ended as depicted in the figures herein, or that the two longitudinal ends of each elongated reflector means may be closed by insertion of end-panels. Advantages with an open-ended apparatus include maximization of longitudinal light distribution and better heat dissipation. The end-panels in a closed-ended apparatus may interfere with longitudinal light distribution which interference may be minimized or alleviated by outwardly slanting the end-caps so that their bottom edges are further away from the light source(s). It should also be obvious that the angles of the slant may be adjusted in circumstances where a more defined or limited longitudinal light distribution pattern is desired.

Said end-panels in general may consist of flat pieces of material having a similar shape to the cross section of the elongated reflector means attached to each end opening of the elongated reflector means by conventional methods such as welding or chemical or threaded fastener means. Preferably, the material forming the end panels is the same material as the elongated reflector means as noted above and that said end-panels may be flat or curved, depending on the desired longitudinal light distribution pattern and/or aesthetics of the lighting apparatus.

In another aspect of the present invention, the inventors contemplate improved lighting arrays each comprising an array of multiple improved lighting apparati of the present invention so positioned with respect to each other to provide uniform and energy-efficient lighting for a large target area.

In one embodiment, multiple improved lighting apparati of the present invention each having the same type of elongated light source are arranged in series and/or in parallel to form an improved lighting array for providing uniform and energy-efficient illumination of a single set of light qualities for a large target area.

In another embodiment, multiple improved lighting apparati of the present invention comprising more than one type of elongated light source are arranged in series and/or in parallel to form an improved lighting array capable of providing uniform and energy-efficient illumination with mixed light qualities for a large target area.

For example, each improved lighting apparatus may comprise more than one type of elongated light source, or alternatively, different improved lighting apparati may contain different types of elongated light source depending on the application and the light qualities required.

In any case, the multiple improved lighting apparati preferably should be arranged adjacent to each other substantially having a substantial orientation towards the target object(s) or area requiring illumination.

The improved lighting apparati and improved lighting arrays of the present invention are useful for applications requiring high-intensity uniform lighting such as horticulture or hydroponics. As noted above, different elongated light sources provide illumination with different light qualities that are required by different varieties of plants and/or by plants at different stages of development. Metal halide and high pressure sodium light sources produce different physiological effects on plants and FIG. 9 illustrates the preferred arrangement of metal halide and high pressure sodium light sources in an improved lighting array for horticulture or hydroponics.

In FIGS. 9A and 9B, the same 12 improved lighting apparati of the present invention are arranged in series and in parallel to each other to provide high intensity, uniform, illumination for a 15' by 20' room (drawing to scale). Apparati designated "MH" are ones essentially as described in FIGS. 1 to 3 each containing a metal halide light source whilst apparati designated "HPS" are ones essentially as described in FIGS. 5 to 7 each containing a high pressure sodium light source. The iso-contour lines and numbers illustrated within the figure are location-specific levels of illumination as presented in Foot Candles (FC), of which 1 FC is a measure of the total intensity of light that falls upon a one square foot surface that is placed 1 foot away from a point source of light that equals 1 candle power. In general, a physiologically detectable difference in light intensity is a greater than 2-fold difference in FC measurements.

The distance between the improved lighting apparati and the points of light measurement is 48" in FIGS. 9A and 9B. Referring therein, the light intensity-directly under a lighting apparatus is mostly about 3000 to 3500 FC while the light intensity under adjacent areas is about 2500 to 3000 FC thereby indicating near-uniform lighting with respect to natural physiological responses.

When supporting a plurality of housings having respective light sources therein, in an array, a plurality of different types of bulbs are preferred. Each housing may include a plurality of different types of bulbs therein as well. The bulbs preferably have different colour characteristics when different bulb types are used for providing even distribution of light throughout the colour range of light.

Conversely, FIGS. 10A and 10B illustrate the same improved lighting array with the exception that the distance between the lighting apparati and the points of light measurement is shortened to 24". In this instance, the maximum observed light intensity is about 4000 to 5000 FC while the minimum observed intensity is about 2000 to 2500 FC, thereby indicating reduction in uniformity. It should be appreciated that although the present illustration is shown with 1000 W metal halide and 1000 W high pressure sodium light sources, substitution of light sources with a different type or power handling of the light source would alter the absolute values of light intensity but not the distribution or uniformity characteristics of the light emissions.

The preferred positioning and spacing between each lighting apparatus of the present invention is therefore a function of the distribution pattern of its light emissions with respect to the distance between each elongated light source and the target for illumination.

One notable benefit of the improved lighting apparati of the present invention is the normalization of their light distribution patterns. For the purposes herein, "normalization" of light distribution primarily infers the rendering of the distribution pattern of light emitted from a source to become substantially uni-modal, which may, but not necessarily, conform to a Gaussian distribution. As noted above, if the threshold for light uniformity is plus or minus a 2-fold difference in FC measurements, the improved lighting apparati should be placed apart so that their respective iso-contour lines representing one-quarter of their maximal light intensity in FC, at any given distance from the elongated light sources, are just overlapping. For example, this spacing criterion would be suitable for a number of applications involving human physiological perception of light uniformity such as indoor lighting for any infrastructure requiring bright and uniform lighting, for instance, an auditorium or a research or manufacturing facility. Similarly, if the tolerance or sensitivity to variability in light uniformity is more stringent, then the improved lighting apparati should be placed apart so that their respective iso-contour lines representing one-half of their maximal light intensity in FC at any given distance from the elongated light sources are overlapping.

The above setups based on the matching of iso-contour lines are robust and are applicable to lighting arrays where the improved lighting apparati are arranged either at the same or at different heights or orientations with respect to each other. However, it is important to note the benefits of the above positioning strategy would only be realized by using lighting apparati with light distribution that resembles a substantially normal distribution and would not be applicable to conventional lighting apparati with multi-modal light distribution patterns.

The following non-limiting examples are illustrative of the present invention:

EXAMPLES

Example 1

Light Distribution from a Parabolic Apparatus of the Prior Art

The major objectives of the present invention are to provide improved lighting apparati that maximize efficiency, distribution as well as uniformity of light emissions from a light source.

Efficiency of each lighting apparatus, in the present case, is measured by the percentage of light emitted by the elongated light source that can exit the lighting apparatus with the fewest number of reflections off (or the least contact with) the elongated reflector means and correspondingly the amount of light emitted by the elongated light source that becomes absorbed, hence wasted, by the elongated reflector means. Distribution is currently measured and depicted by means of Candela polar plots. Most importantly, uniformity of light emissions within the field of distribution is measured and depicted by means of illuminance contour plots and illuminance shaded plots. These parameters for efficiency, distribution and uniformity are commonly assessed and calculated using commercially available ray tracing software programs such as Photopia™ by Lighting Technologies, Inc.

As noted above, conventional elongated light reflector with a parabolic cross section with a V-shaped channel can offer reduced light "trapping" and energy loss within the area between the elongated light source and the vertex of the reflector. However, the V-shaped channel redirects the additional light energy to exit the lighting apparatus via either side of the elongated light source and creates as a side effect uneven illumination usually manifested as two parallel ovoid "hot-spots" sandwiching a central darker area.

Figure 11:
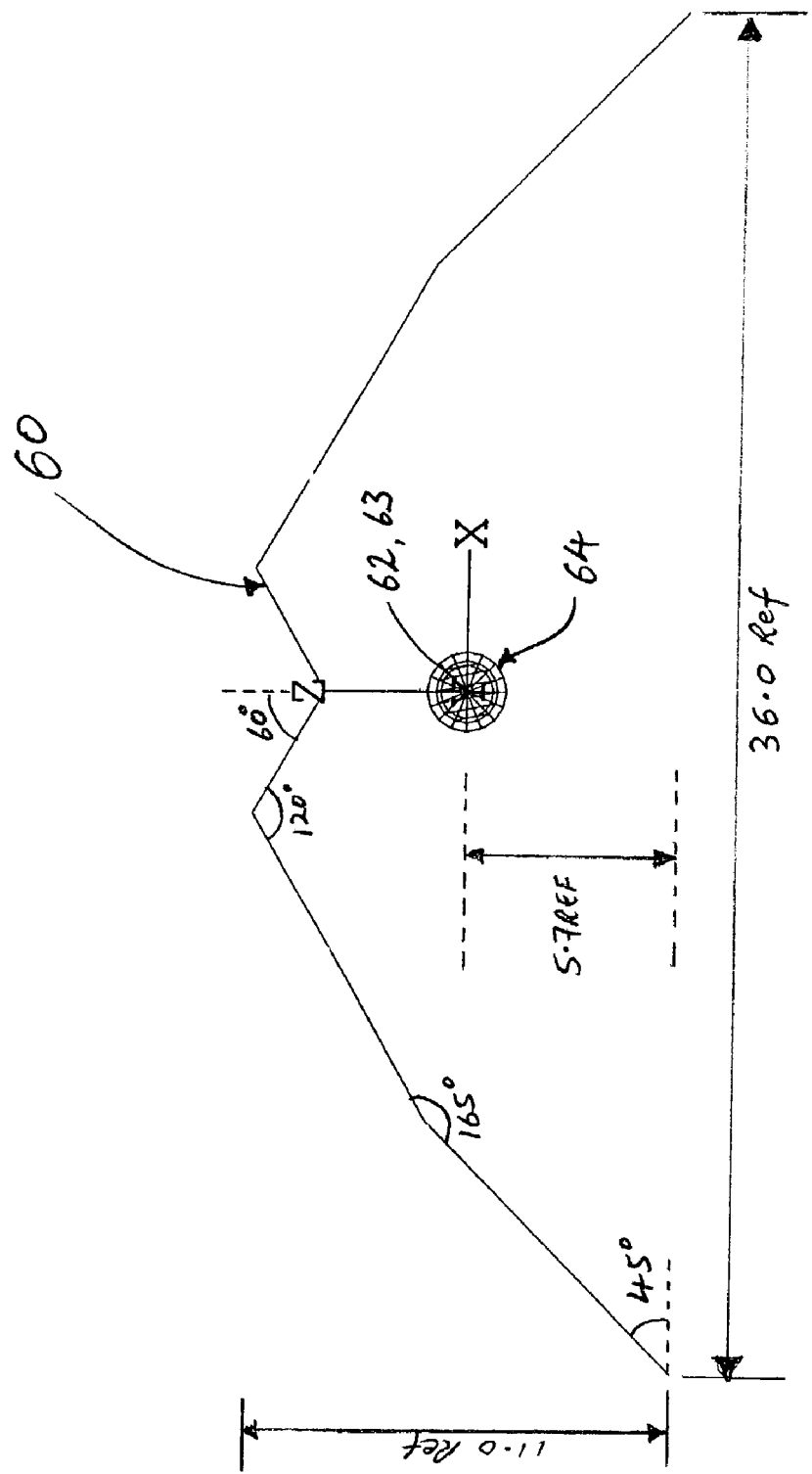
FIG. 11 is a front elevational view illustrating the cross section of a lighting apparatus substantially as described in the prior art.

FIG. 11 illustrates a front elevational view of such an elongated light reflector 60 substantially as described in the prior art. An elongated tubular light source 64 is a 1000 W 250V S52 high pressure sodium LU1000 lamp with an E-25 clear tubular bulb which is disposed centrally widthwise within the elongated reflector means and longitudinally along the length of said elongated reflector means. The dimensions of this elongated light 60 reflector is essentially the same as those of the elongated light reflector presented in FIG. 4, but it is important to note that the longitudinal center axis 62 of said elongated tubular light source 64 is disposed along the elongated reflector means at the optical center 63 of said elongated reflector means, as previously taught by the prior art.

Figure 12:
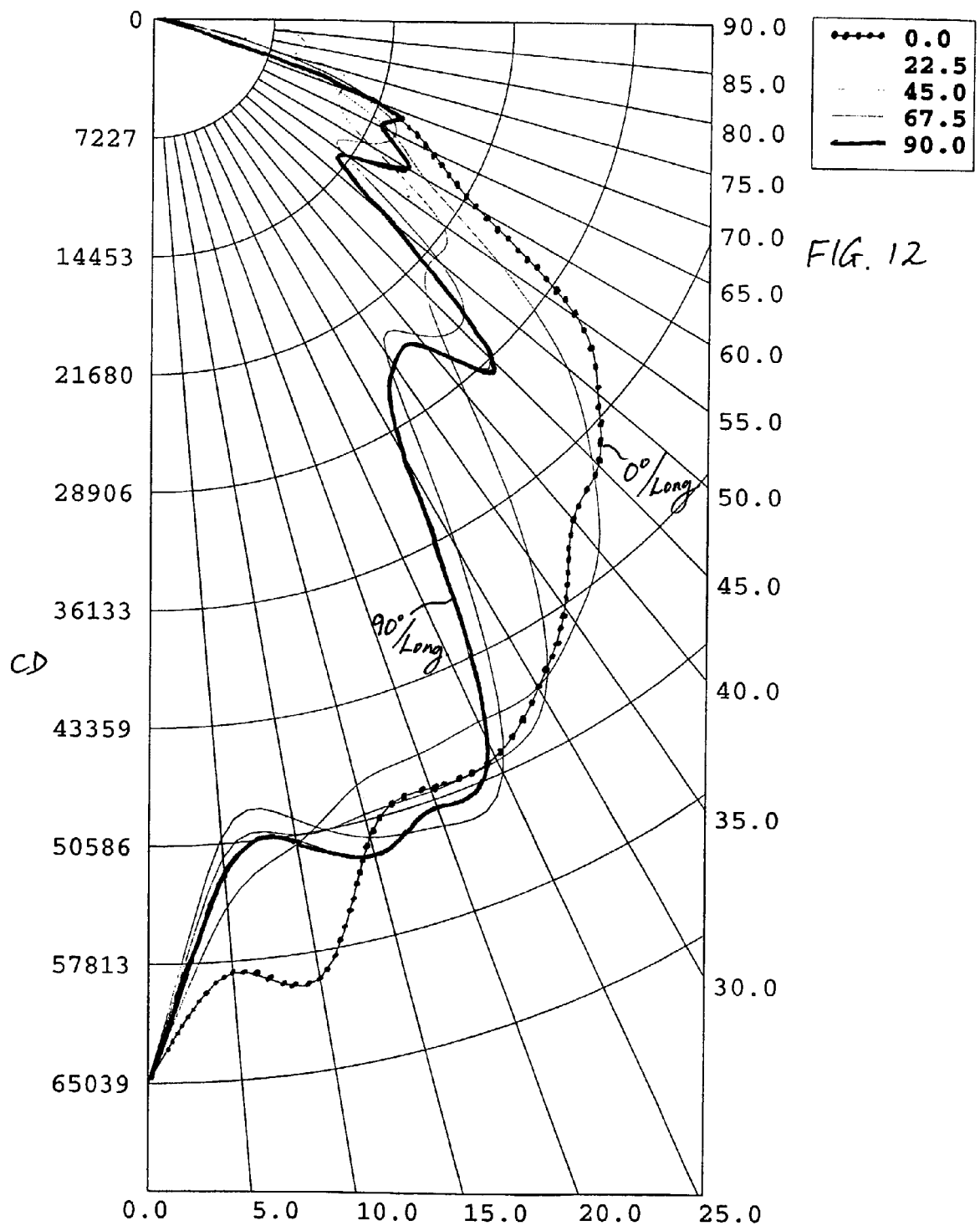
FIG. 12 shows a three-dimensional Candela distribution polar plot for the prior art lighting apparatus described in FIG. 11.
Figure 13:
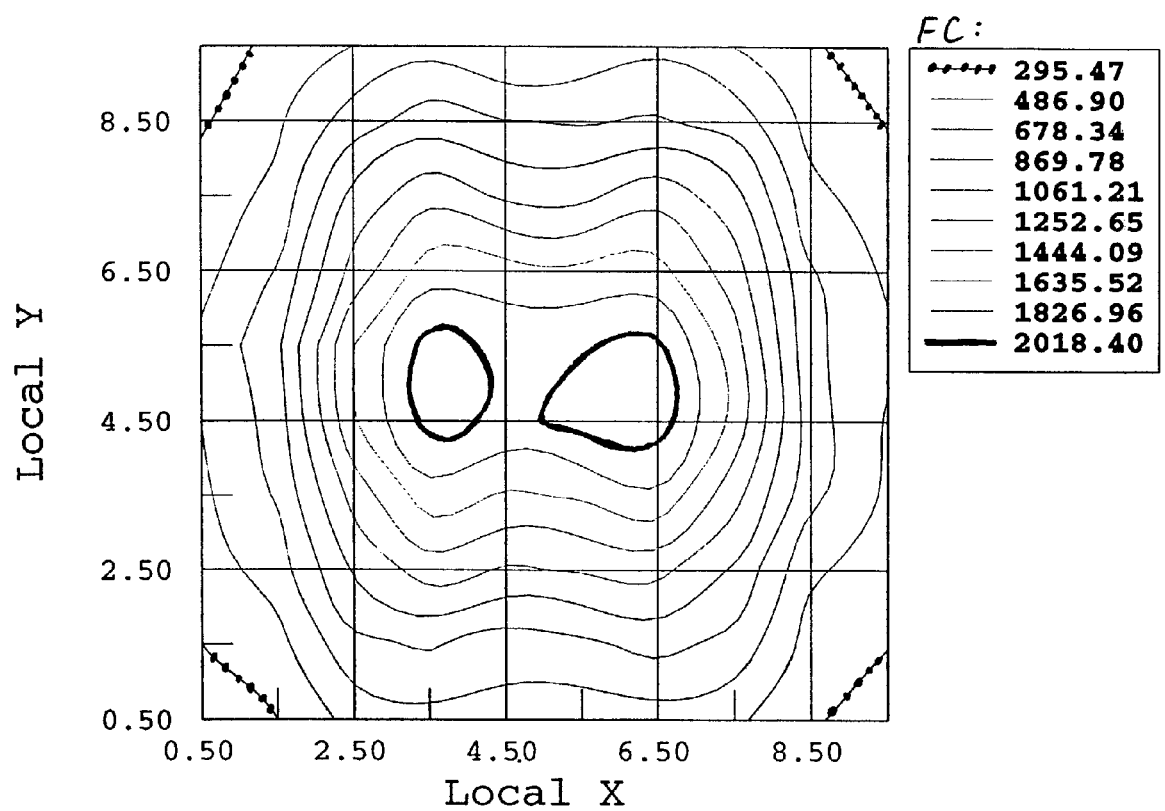
FIG. 13 shows an illuminance iso-contour plot for the prior art lighting apparatus described in FIG. 11.

FIGS. 12 and 13 illustrates the light distribution characteristics of the elongated light reflector of the prior art as described in FIG. 11.

Referring to FIG. 12, this Candela polar plot illustrates the directional distribution or dispersion of light as emitted by the elongated light source and as detected by a target situated at different directions with respect to the elongated light source.

The unitage of the left vertical Y-axis is in the number of Candela which is a measure of the luminous intensity, in a given direction, of the elongated light source. The unitage of the X-axis and the right vertical Y-axis is in degrees which represents the latitudinal angle from which the luminous intensity is measured. The two lines, respectively labeled 0°/Long and 90°/Long, provide a three-dimensional representation of the luminous intensity measurements by incorporating a longitudinal angle component. For example, a 0° latitudinal angle along the 0°/Long graph line is equivalent of looking at the elongated light source directly from underneath the elongated reflector means, a 90° latitudinal angle along the 0°/Long graph line is equivalent of looking at the end of the elongated light source when looking at a front elevational view of the elongated reflector means, while a 90° latitudinal angle along the 90°/Long graph line is equivalent of looking at the side of the elongated reflector means when looking at a side elevational view of the elongated reflector means. The remaining lines appearing on the polar plot at spaced positions between the 0°/Long graph line and the 90°/Long graph line represent measurements taken at respective positions spaced between the positions of measurement of said graph lines and are labeled consecutively in order from the 0°/Long graph line to the 90°/Long graph line on the accompanying legends which appear with all of the polar plots illustrated herein.

As evident from the polar plots, the 0°/Long line is substantially semi-circular showing a peak luminous intensity of 65039 Candela at 0° longitudinally and 0° latitudinally which gradually decreases as one moves from looking at the elongated light source from directly underneath the elongated reflector means towards a front elevational view until about 55° where luminous intensity decreases relatively sharply to zero. The relative smoothness of this 0°/Long polar plot is indicative of relative uniformity of light distributed along the longitudinal axis of the lighting apparatus.

Conversely, referring to the 90°/Long line illustrating the changes in luminous intensity when one moves from looking at the elongated light source from directly underneath the elongated reflector means towards a side elevational view, the peak luminous intensity at 0° longitudinally and 0° latitudinally is the same at 65039 Candela, but the profile of this plot is illustrative stepwise fluctuations/reductions in luminous intensity as one moves towards a side elevational view. The first step occurs from about 0° to about 5° rapidly dropping luminous intensity by about 25%, the second step from about 25° to about 35° where luminous intensity drops dramatically by about 50%, the third step from about 45° to about 50° where luminous intensity drops by another about 50%, and so on.

These relatively steep and stepwise fluctuations of this 90°/Long polar plot is indicative of a relatively narrow light distribution or dispersion pattern of the elongated reflector means and potentially of uneven illumination producing peaks and troughs in light intensity.

FIG. 13 is an iso-contour plot illustrating the degree of uniformity of illumination provided by the elongated lighting apparatus of the prior art as described in FIG. 11. The X- and Y-axis represent distance in feet with the lighting apparatus located in the center of the plot. The iso-contour lines plotted herein are representative of different levels of illumination as measure in FC at 36" from the elongated light source.

Evidently, this iso-contour plot for the prior art lighting apparatus illustrates classical "dual hot-spotting" as represented by the two parallel ovoid areas suffering from intense illumination sandwiching a central "shade" area.

This confirms the aforementioned adversity associated with the simple insertion of a V-shaped channel into a conventional elongated light reflector with a conic cross section without taking consideration of re-optimization of positioning of the elongated light source as taught by the present invention.

Example 2

Figure 14:
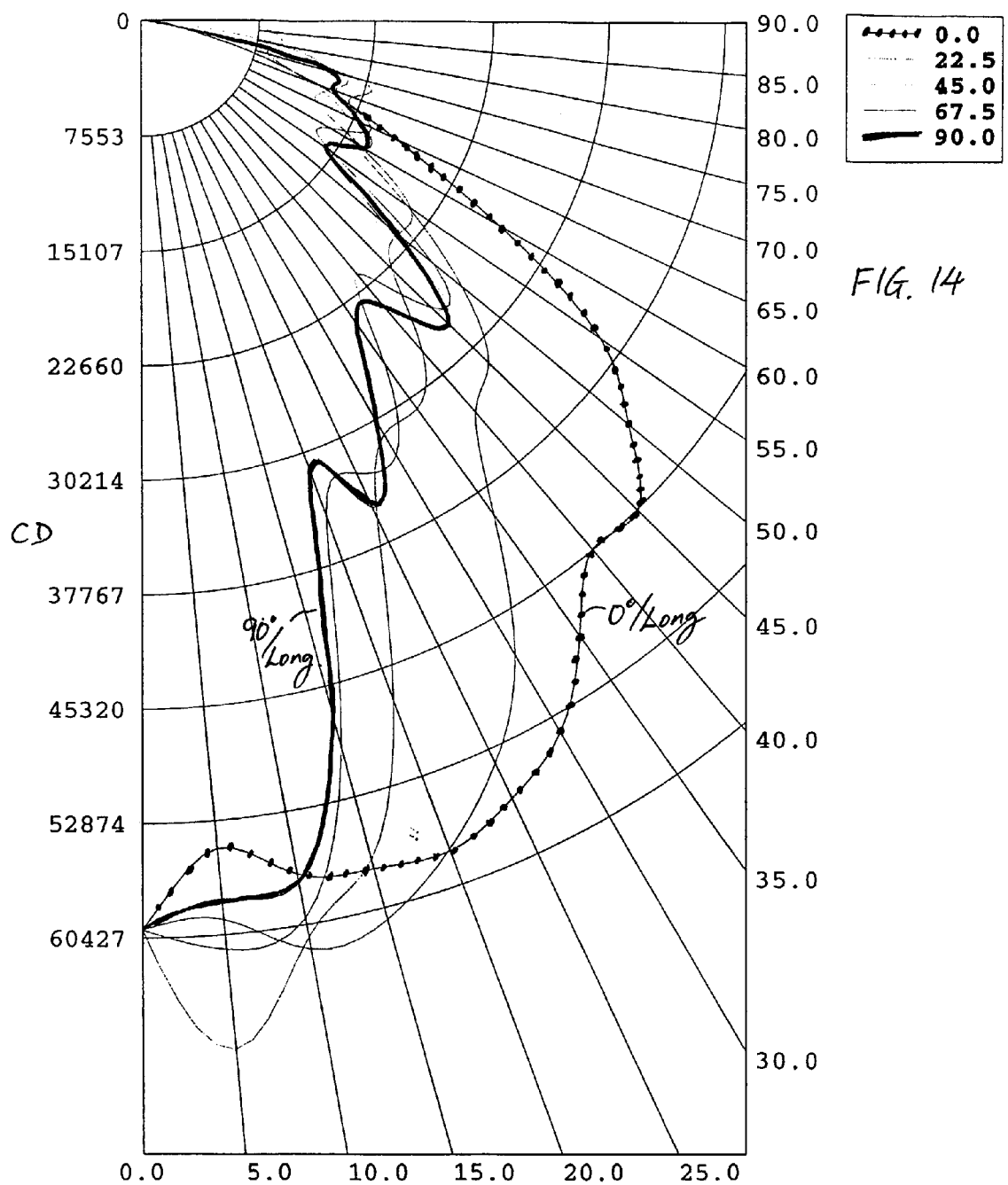
FIG. 14 shows a three-dimensional Candela distribution polar plot for the improved lighting apparatus as described in FIG. 4 comprising an elongated tubular light source disposed longitudinally 2" beyond the optical center of the reflector.
Figure 15:
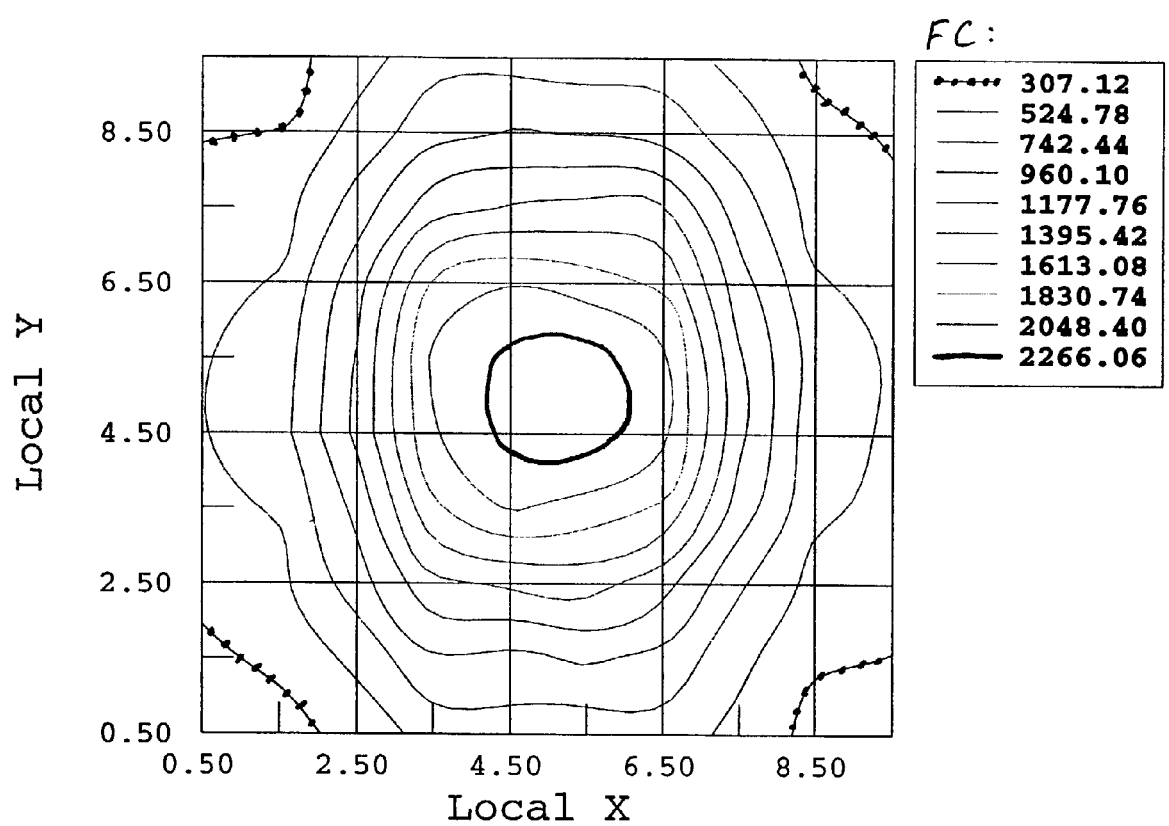
FIG. 15 shows an illuminance iso-contour plot for the improved lighting apparatus as described in FIG. 4 comprising an elongated tubular light source disposed longitudinally 2" beyond the optical center of the reflector.

Light Distribution from a Parabolic Lighting Apparatus of the Present Invention with a Horizontally Disposed Elongated Light Source FIGS. 14 and 15 illustrate the light distribution characteristics of the improved lighting apparatus as described in FIG. 4. Cross-referencing with FIG. 4, the elongated tubular light source 56 is a 1000 W 250V S52 high pressure sodium LU1000 lamp with an E-25 clear tubular bulb which is disposed centrally widthwise within the elongated reflector means and longitudinally along the about one-third of the length of said elongated reflector means. The longitudinal center axis 58 of said elongated tubular light source 56 is disposed along the elongated reflector means at 2" beyond the optical center 54 of said elongated reflector means.

Referring to FIG. 14, this Candela polar plot illustrates the latitudinal and longitudinal directional distribution or dispersion of light as emitted by the elongated light source and as detected by a target situated at different directions with respect to the elongated light source.

As evident from the polar plots, the 0°/Long line is substantially semi-circular showing a peak luminous intensity of 60427 Candela at 0° longitudinally and 0° latitudinally which gradually decreases as one moves from looking at the elongated light source from directly underneath the elongated reflector means towards a front elevational view until about 55° where luminous intensity decreases relatively sharply to zero. The relative smoothness of this 0°/Long polar plot is indicative of relative uniformity of light distributed along the longitudinal axis of the lighting apparatus.

In contrast to the 90°/Long line described in FIG. 12 for the prior art apparatus, the 90°/Long line of the present improved lighting apparatus is substantially more semi-circular indicating a more uniform and normalized light distribution pattern. The repositioning of the elongated light source to 2" beyond the optical center away from the directrix of the elongated reflector means abolished the undesired dramatic drop in luminous intensity between 0° and 5° and between 25° and 35° associated with the prior art apparatus as depicted in FIG. 12 and significantly smoothed the latitudinal stepwise fluctuations in luminous intensity as noted with the 90°/Long line in FIG. 12. With the exception of the smoothing of the undesired "steps" from FIG. 12, the overall breadth of light distribution of this improved lighting apparatus is similar to that of the prior art apparatus in FIG. 11.

FIG. 15 is an iso-contour plot to confirm the improved uniformity of illumination provided by the improved lighting apparatus of the present invention. Evidently, the adverse "dual hot-spotting" phenomenon associated with the prior art apparatus as illustrated in FIG. 13 is eliminated and replaced by a set of concentrically arranged iso-contour lines indicating a substantially uni-modal normal distribution of light emitted from the improved lighting apparatus of the present invention.

As noted above, this normalization of light distribution from the improved lighting apparati of the present invention is preferred for providing more uniform and predictable lighting for a given target placed under each improved lighting apparatus and it is also a prerequisite for the specific positioning of a plurality of improved lighting apparati to form the improved lighting arrays of the present invention.

Figure 16:
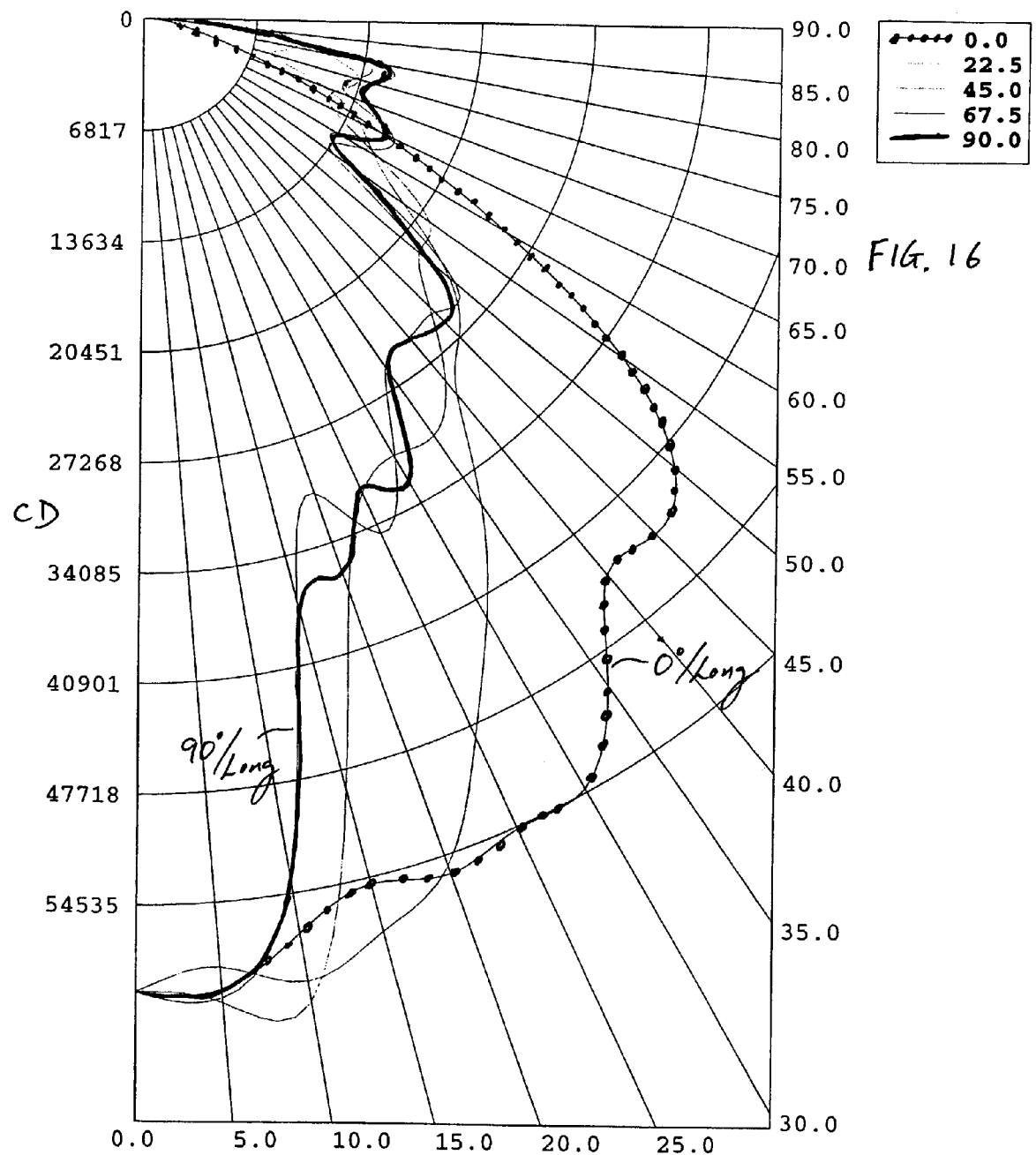
FIG. 16 shows a three-dimensional Candela distribution polar plot for the improved lighting apparatus as described in FIG. 4 comprising an elongated tubular light source disposed longitudinally 4" beyond the optical center of the reflector.
Figure 17:
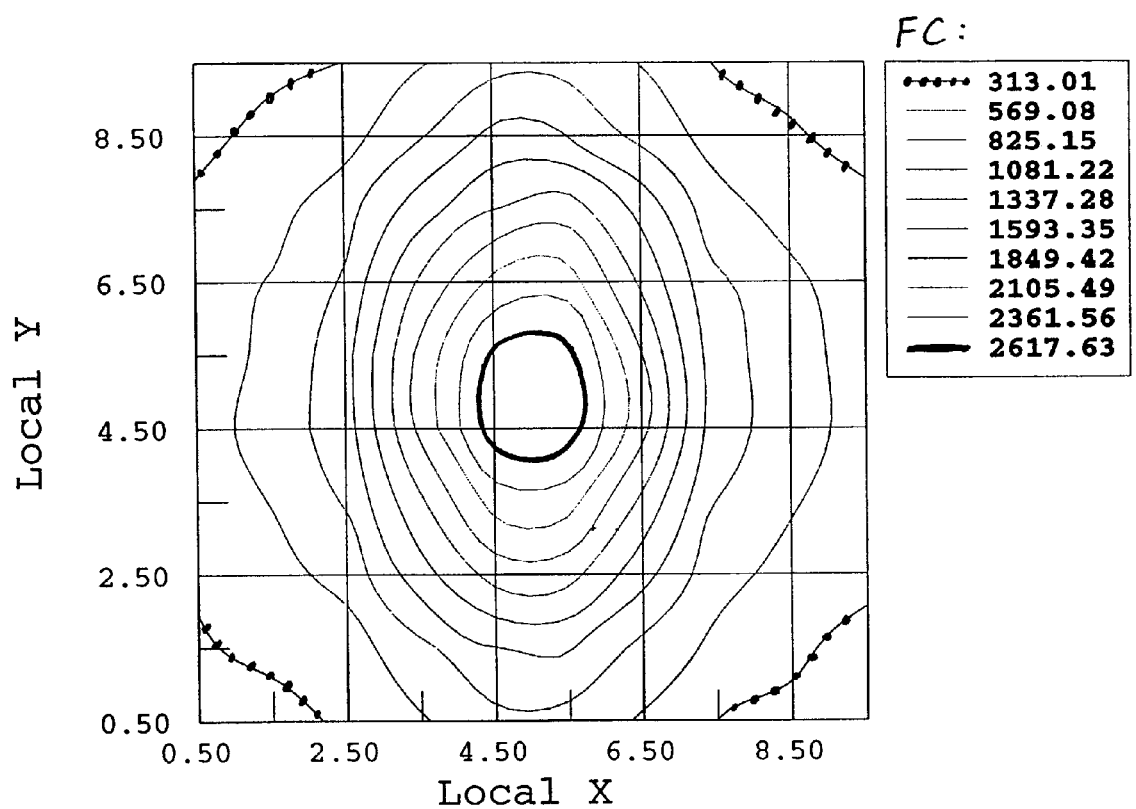
FIG. 17 shows an illuminance iso-contour plot for the improved lighting apparatus as described in FIG. 4 comprising an elongated tubular light source disposed longitudinally 4" beyond the optical center of the reflector.

To further illustrate the applicability of the present invention, FIGS. 16 and 17 illustrate the light distribution characteristics of a very similar setup to that described in FIG. 4, with the exception that the longitudinal center axis of the elongated tubular light source (again a 1000 W 250V S52 high pressure sodium LU1000 lamp with an E-25 clear tubular bulb) is now disposed along the elongated reflector means at 4" beyond the optical center of said elongated reflector means.

Again, the 0°/Long and 90°/Long lines in FIG. 16 are relatively semi-circular as compared to those in FIG. 12 indicating improved uniformity of light distributed along the longitudinal axis of the lighting apparatus. The iso-contour plot in FIG. 17 also illustrates a set of concentrically arranged iso-contour lines confirming a substantially unimodal normal distribution and improved uniformity of light emitted from this improved lighting apparatus.

The data presented above have evidenced the ability of the novel designs of the improved lighting apparati of the present invention to improve uniformity of light emissions without sacrificing the breadth of distribution of same.

With respect to the efficiency of the improved lighting apparati of the present invention, the inventor has also surprising discovered that by optimizing the positioning of the elongated light source as taught in the present invention, the efficiency of light output is also improved as compared to conventional parabolic lighting apparati, even ones with the V-shape rib integrals.

Referring to Table 1 below, data presented compare the efficiency of the parabolic lighting apparatus of the prior art as shown in FIG. 11, the improved lighting apparatus of the present invention as shown in FIG. 4 wherein the longitudinal axis of the elongated light source is positioned 2" beyond the optical center of the elongated reflector means, and the similarly improved lighting apparatus of the present invention as described for in FIGS. 16 and 17 wherein the longitudinal axis of the elongated light source is positioned 4" beyond the optical center of the elongated reflector means. It is evident from the tabulated data that as the distance between the elongated light source and the optical center of the elongated reflector means increases, the amount of light directly exiting the lighting apparatus (no reflections) increases substantially while the amount of light being reflected twice off the elongated reflector means before existing the apparatus decreases substantially. Overall, the amount of light absorbed by the lighting apparatus, hence wastage of light energy, decreases dramatically with an increase in distance between the elongated light source and the optical center of the elongated reflector means.

TABLE 1

Efficiency of Parabolic Lighting Apparati with a V-Shape Rib Integral and a Horizontally Disposed Elongated Light Source

| Apparatus Configuration/position of light source beyond optical center | % Light exiting apparatus after 0 reflection off reflector | % Light exiting apparatus after 1 reflection off reflector | % Light exiting apparatus after 2 reflections off reflector | % Light absorbed by apparatus |
|---|---|---|---|---|
| Parabolic/0"(FIG. 11) | 41.1 | 39.6 | 12.2 | 5.1 |
| Parabolic/2"(FIG. 4) | 44.1 | 39.3 | 8.9 | 4.6 |
| Parabolic /4" | 47.0 | 38.6 | 6.7 | 4.0 |

Light Source: 1000 W 250 V S52 high pressure sodium LU1000 lamp with an E-25 clear tubular bulb The increase in efficiency is further confirmed by the iso-contour plots in FIGS. 15 and 17 in that while the highest light intensity can is observed with the elongated lighting apparatus of the prior art (as indicated by the highest value iso-contour ring in FIG. 13) is about 2020 FC, the highest light intensities observed with the improved lighting apparati as shown in FIGS. 15 and 17 are about 2270 and about 2620, respectively.

Example 3

Light Distribution from an Elliptical Lighting Apparatus of the Present Invention with a Horizontally Disposed Elongated Light Source The present example compares the lighting characteristics of another improved lighting apparatus of the present invention comprising an elongated reflector means with a substantially elliptical cross section and a V-shape rib integral as illustrated in FIGS. 1 to 3.

Figure 18:
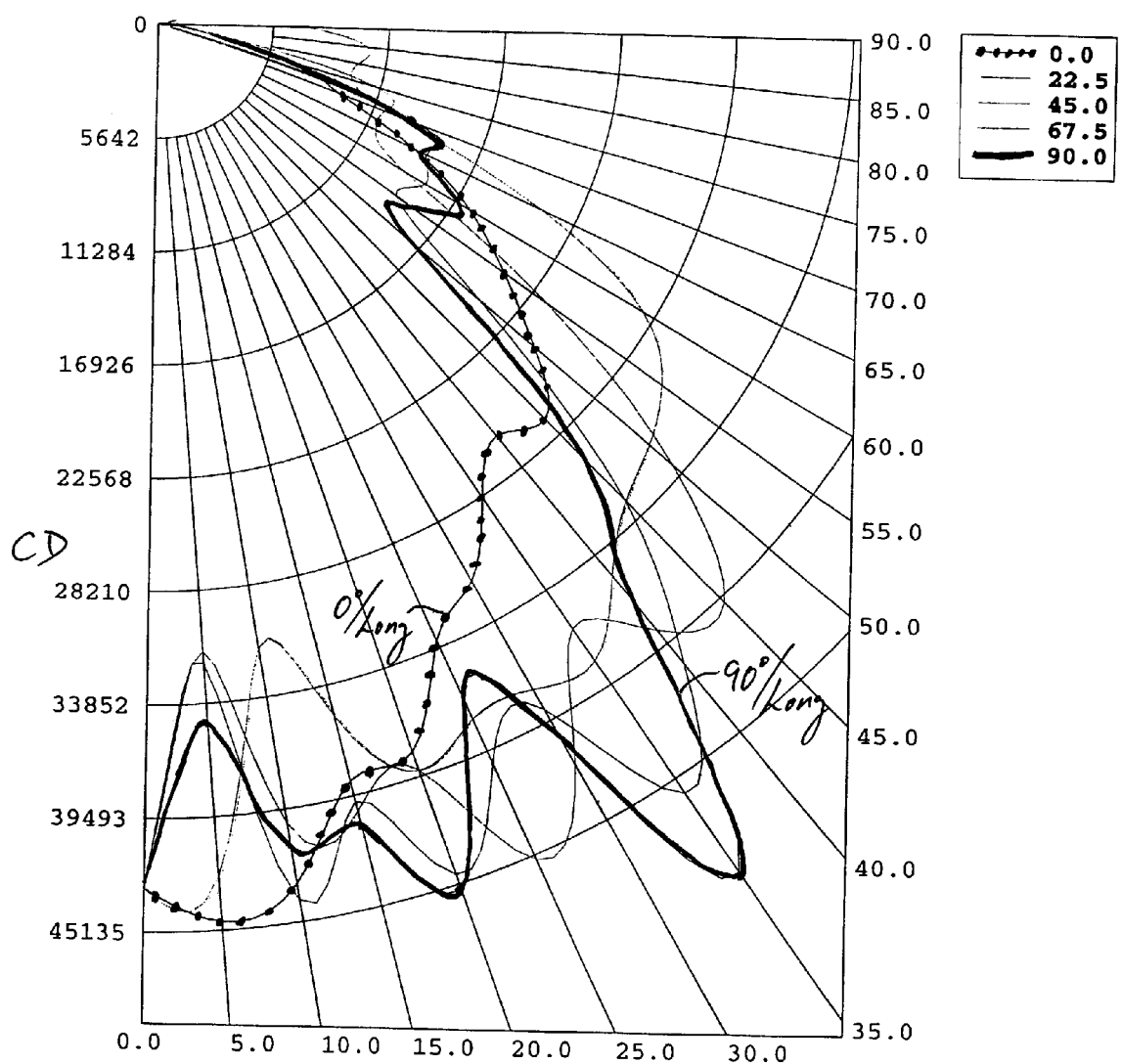
FIG. 18 shows a three-dimensional Candela distribution polar plot for the lighting apparatus as described in FIGS. 1 to 3 with the exception that the elongated tubular light source disposed longitudinally at the optical center of the reflector.
Figure 19:
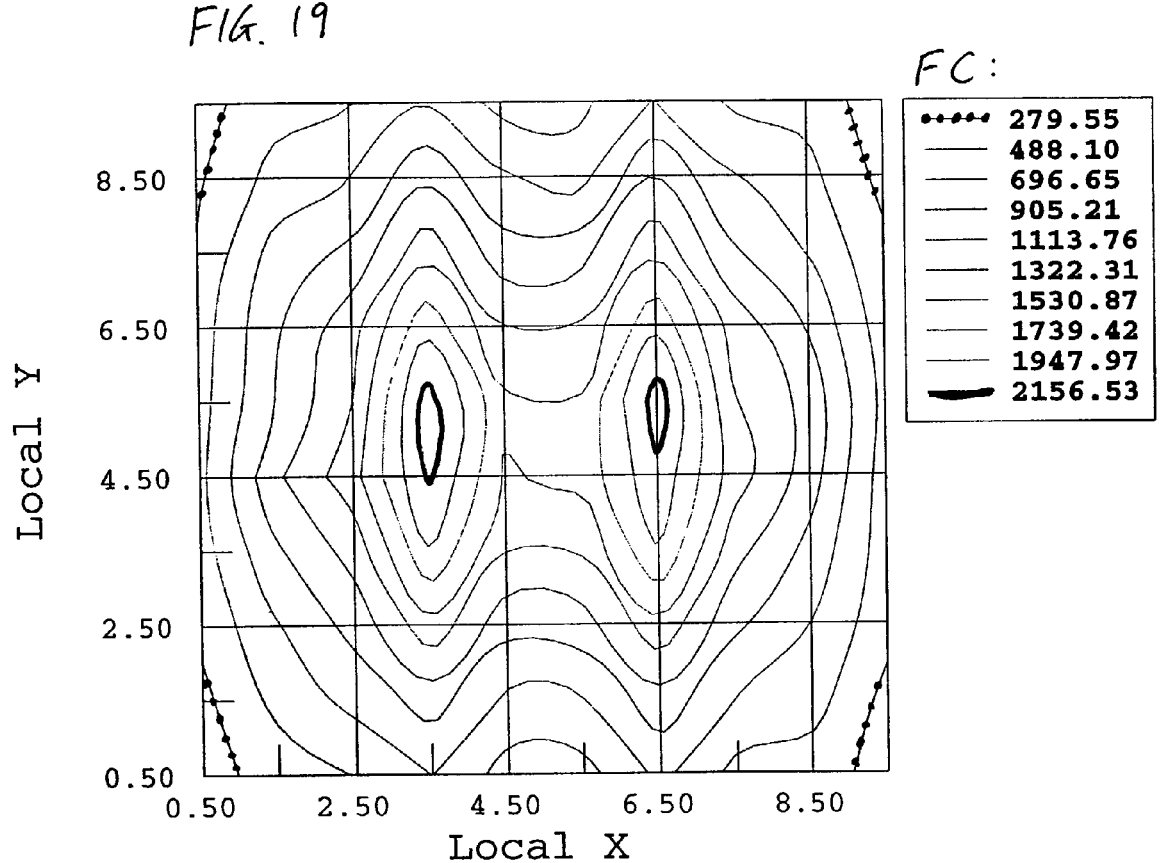
FIG. 19 shows an illuminance iso-contour plot for the lighting apparatus as described in FIG. 4 with the exception that the elongated tubular light source disposed longitudinally at the optical center of the reflector.

For baseline measurements, the present elliptical lighting apparatus is tested with the same elongated light source (1000 W 250V S52 high pressure sodium LU1000 lamp with an E-25 clear tubular bulb) disposed longitudinally with its longitudinal center at the optical center of the elongated reflector means. FIGS. 18 illustrates a Candela polar plot for such a setup in which the 0°/Long line is relatively semi-circular implicating relative uniformity in longitudinal light emissions, while the 90°/Long line shows dramatic fluctuations which suggest uneven illumination and multiple "hot-spotting". A corresponding iso-contour plot as illustrated in FIG. 19 confirms the presence of the classical "dual hot-spotting" again as manifested by the two parallel ovoid areas suffering from intense illumination sandwiching a central "shade" area. In terms of lighting efficiency, 41.1% of light emitted from the elongated light source exits the lighting apparatus with no reflection, 39.6% of the light exits the apparatus after one reflection, 8% of the light exits the apparatus after two reflections, and a total of 4.8% of light emitted by the elongated light source is absorbed by the lighting apparatus.

As expected, the lighting characteristics of this elliptical elongated reflector means, when its elongated light source disposed at the optical center, are very similar to the aforementioned parabolic elongated reflector means of the prior art also with its elongated light source disposed at the optical center of the elongated reflector means. The present results affirm that while the conventional setup and placement of the elongated light source can improve efficiency, they do not optimize light distribution and uniformity.

Figure 20:
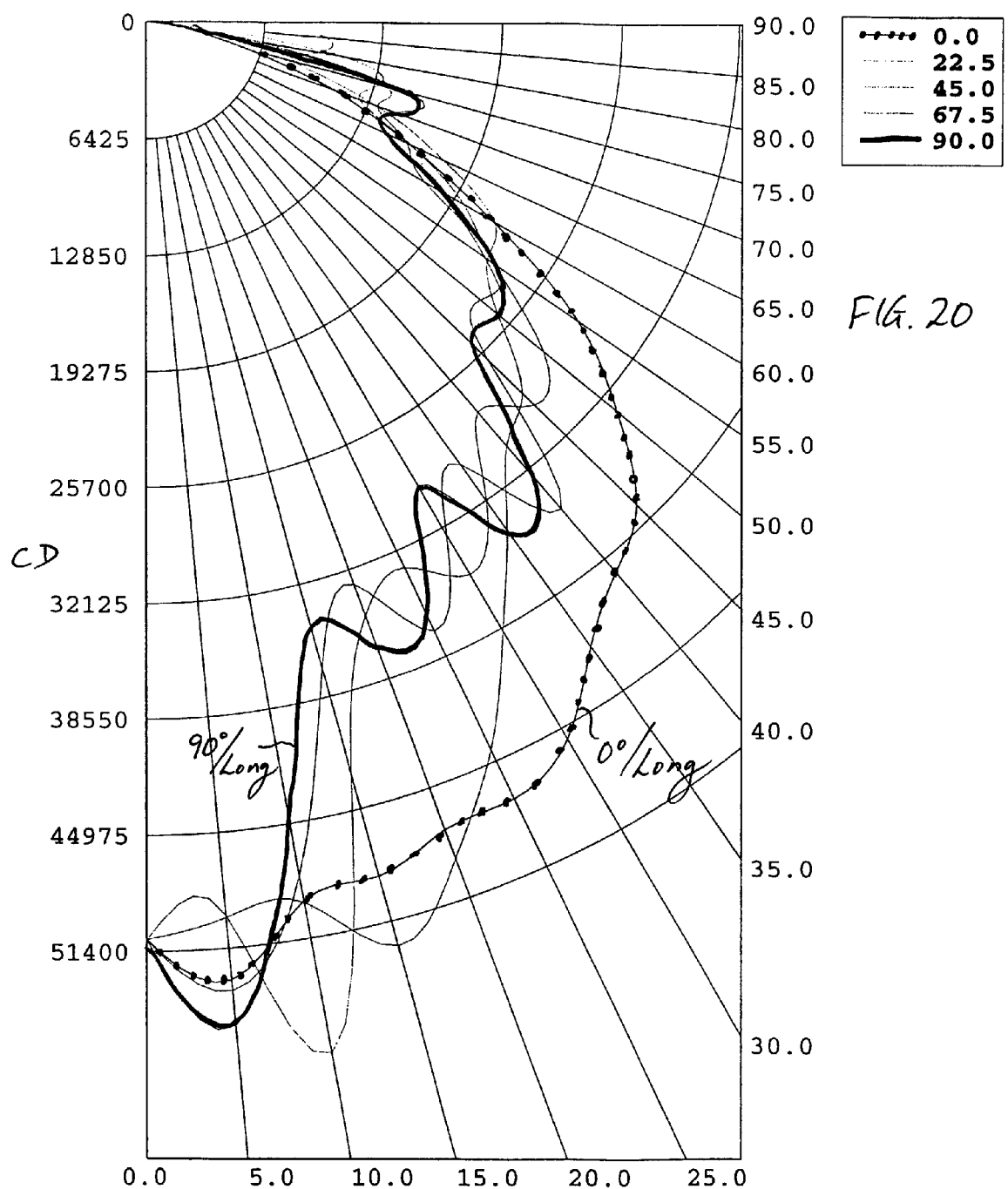
FIG. 20 shows a three-dimensional Candela distribution polar plot for the improved lighting apparatus as described in FIGS. 1 to 3 comprising an elongated tubular light source disposed longitudinally 2" beyond the optical center of the reflector.
Figure 21:
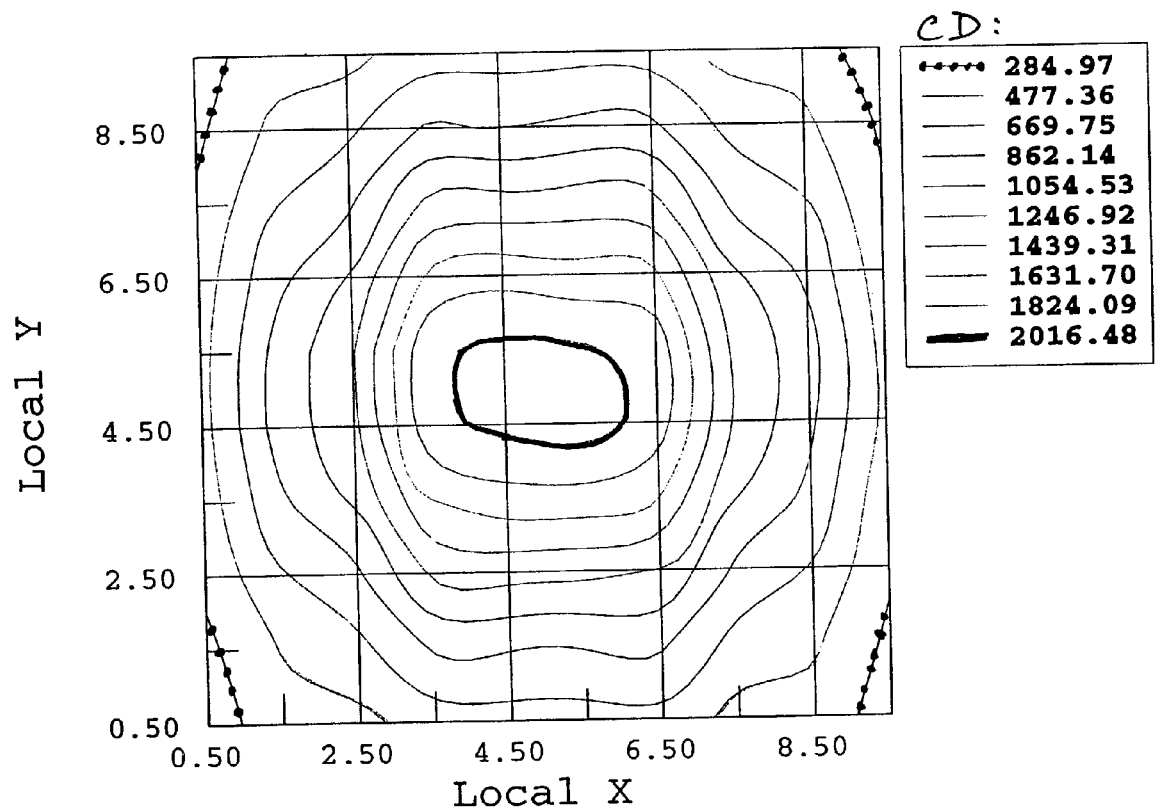
FIG. 21 shows an illuminance iso-contour plot for the improved lighting apparatus as described in FIGS. 1 to 3 comprising an elongated tubular light source disposed longitudinally 2" beyond the optical center of the reflector.

To further demonstrate the benefits of the improved lighting apparatus of the present invention, FIGS. 20 and 21 illustrate the lighting characteristics of the same elliptical elongated reflector means as illustrated in FIGS. 1 to 3 but with the same elongated light source disposed in a manner that its longitudinal axis is 2" beyond the optical center of the elliptical elongated reflector means. The Candela polar plot in FIG. 20 clearly demonstrates significant smoothing of the fluctuations observed from the baseline setup in FIG. 18 albeit with a similar breadth of light distribution. The illuminance iso-contour plot in FIG. 20 also confirms the normalization of light distribution as evidenced by the replacement of the "dual hotspots" by substantially parallel concentric circular iso-contour rings.

As noted above with the parabolic elongated reflector means, the repositioning of the elongated light source as taught herein again surprisingly improved lighting efficiency. In this instance, repositioning the longitudinal axis of the elongated light source to 2" beyond the optical center of the elliptical elongated reflector means significantly reduced the amount of light absorbed by the lighting apparatus from circa 5% to less than 4%. Other pertinent data, and for comparison, data for the prior art parabolic apparatus as described in FIG. 11, are presented in Table 2.

TABLE 2

Efficiency of Elliptical Lighting Apparati with a V-Shape Rib Integral and a Horizontally Disposed Elongated Light Source

| Apparatus Configuration/position of light source beyond optical center | % Light exiting apparatus after 0 reflection off reflector | % Light exiting apparatus after 1 reflection off reflector | % Light exiting apparatus after 2 reflections off reflector | % Light absorbed by apparatus |
|---|---|---|---|---|
| Parabolic/0" | 41.1 | 39.6 | 12.2 | 5.1 |
| Elliptical/0" | 41.1 | 39.6 | 8.0 | 4.8 |
| Elliptical/2" | 44.3 | 42.0 | 5.1 | 3.9 |
| Elliptical/3" | 45.9 | 41.6 | 4.2 | 3.6 |

Light Source: 1000 W 250 V S52 high pressure sodium LU1000 lamp with an E-25 clear tubular bulb As evident from Table 2, further lowing of the longitudinal axis of the elongated light source to 3" beyond the optical center of the elongated reflector means further improved the efficiency of the lighting apparatus. However, it should be cautioned that while the repositioning of the elongated light source away from the optical center and the directrix of the elongated reflector means can minimize energy loss due to absorption by the elongated reflector means, excessive repositioning of the elongated light source would eventually negate any and all benefits that may be conferred by the elongated reflector means in terms of direction and distribution of its light emissions thereby requiring altered positioning of the lighting apparati to the target objects in order to achieve the desired intensity of illumintation. In essence, as the elongated light source is moved further away from the optical center of the elongated reflector means, light distribution would first become increasingly narrower and more focussed up to a point when the elongated light source becomes totally exposed outside of the confines of the elongated reflector means and light distribution becomes isotropic. In view of the potential shortcomings of the above, the longitudinal axis of the elongated light source should preferably remain within the bounds of the elongated reflector means and should not be repositioned to the extent that the elongated light source is fully exposed past the side edges of the elongated reflector means.

Example 4

Light Distribution from a Parabolic Apparatus of the Present Invention with a Vertically Disposed Elongated Light Source and a Central V-Shape Rib Integral Another aspect of the present invention is to provide improved lighting apparati designed to maximize output, distribution and uniformity of light energy emitted from an elongated light source substantially perpendicularly or vertically disposed with respect to the directrix of the elongated reflector means.

As noted above, conventional elongated light reflector with a parabolic cross section with a V-shaped channel can offer reduced light "trapping" and energy loss within the area between the elongated light source and the vertex of the reflector. However, the V-shaped channel redirects the additional light energy to exit the lighting apparatus via either side of the elongated light source and creates as a side effect uneven illumination usually manifested as two parallel ovoid "hot-spots" sandwiching a central darker area.

Figure 22:
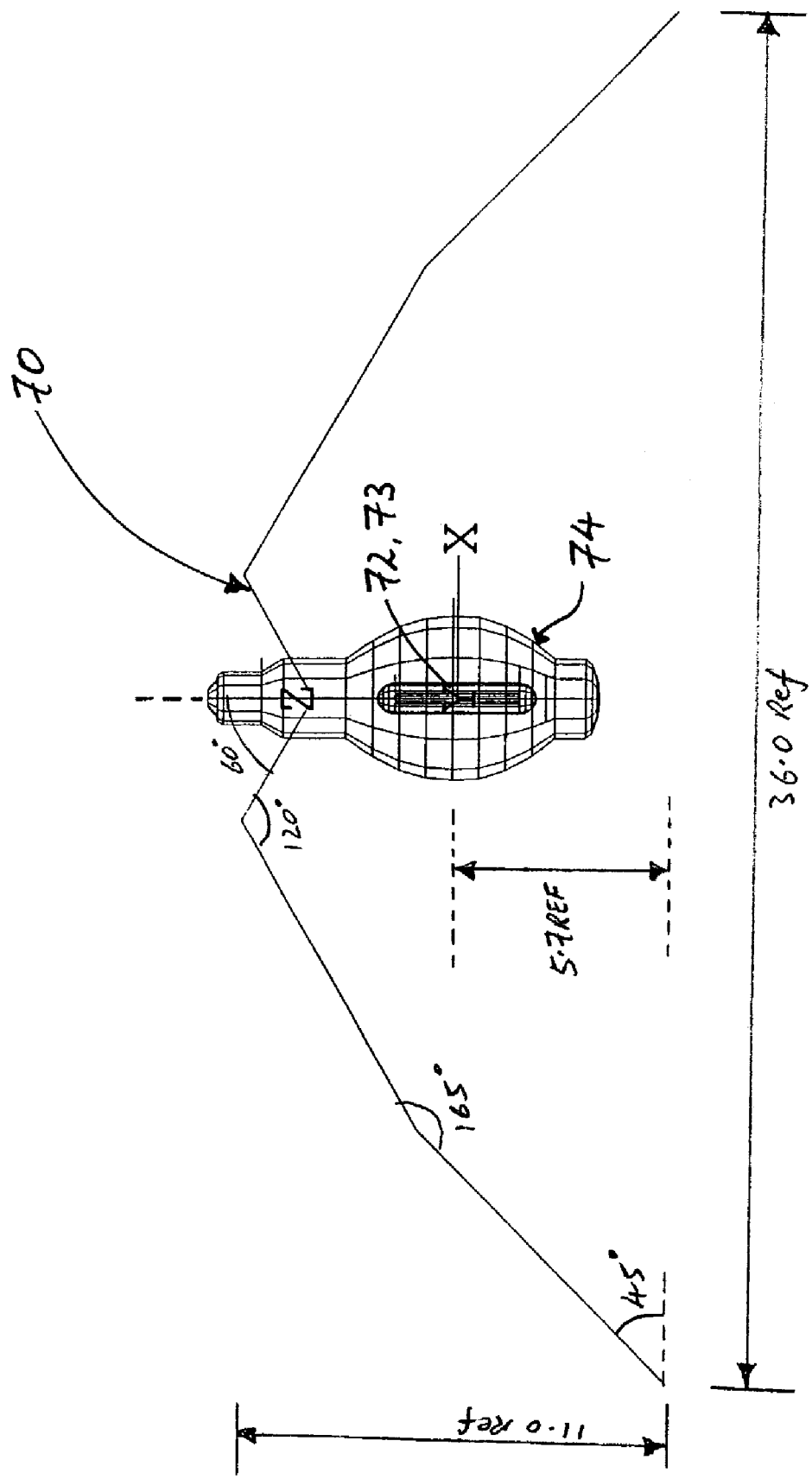
FIG. 22 is a front elevational view illustrating the cross section of a lighting apparatus comprising an elongated reflector means with a substantially parabolic cross section as described in the prior art but with an elongated tubular light source disposed perpendicularly at the optical center of the elongated reflector means.

This principle as demonstrated herein applies to both horizontally disposed light sources as well as vertically disposed light sources. FIG. 22 illustrates a front elevational view of an elongated light reflector 70 substantially as described in the prior art comprising a substantially parabolic cross section and a centrally and longitudinally disposed V-shape rib integral. An elongated ovoid light source 74 is a 1000 W M47 metal halide MH1000 lamp with a BT-37 ovoid bulb which is disposed centrally widthwise within the elongated reflector means and perpendicularly with respect to the directrix of the parabolic cross section of the elongated reflector means. In this example, the geometric center 73 of the elongated light source 74 is positioned at the optical center 72 of the elongated reflector means. The dimensions of this elongated light 70 reflector is essentially the same as those of the elongated light reflector presented in FIG. 11.

Figure 23:
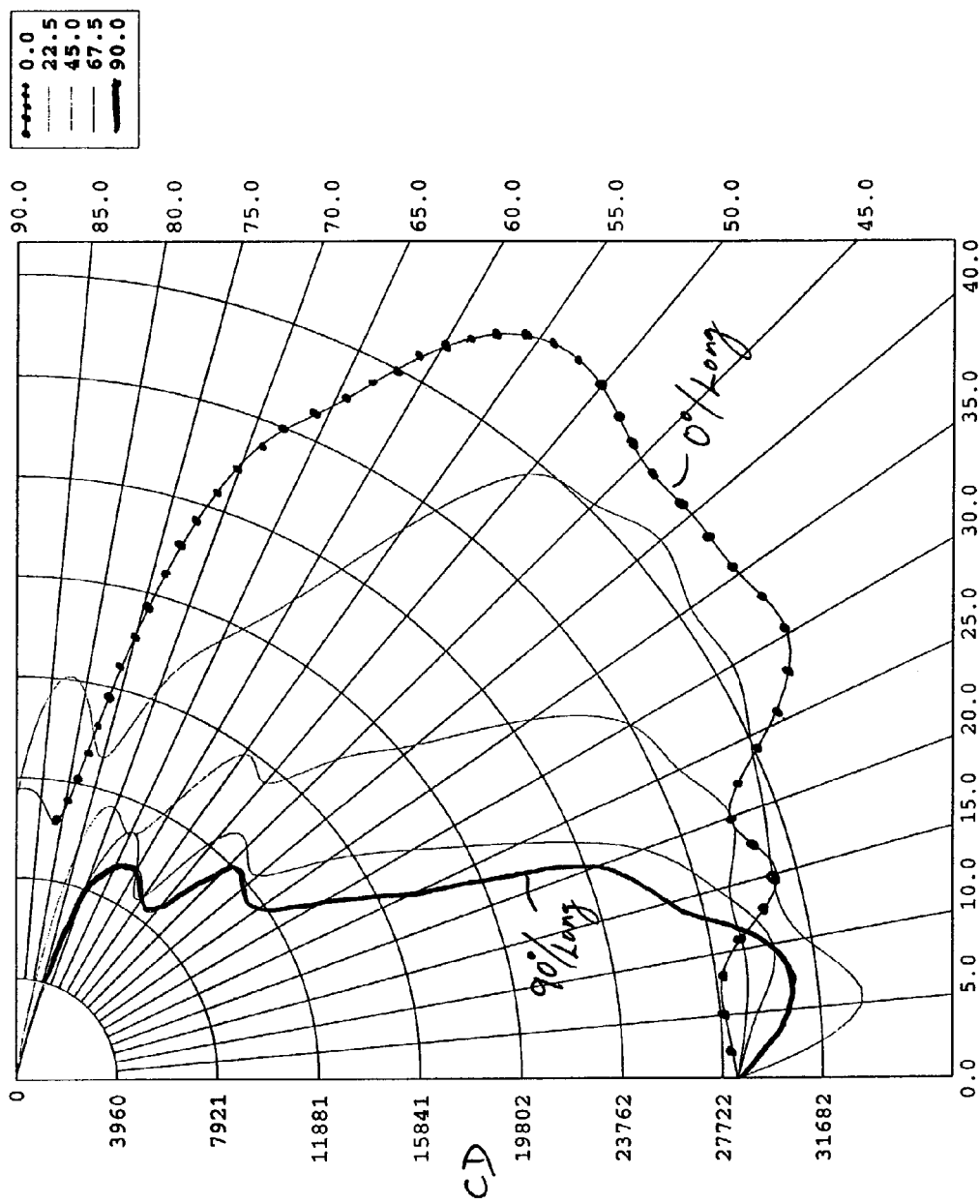
FIG. 23 shows a three-dimensional Candela distribution polar plot for the improved lighting apparatus in FIG. 22 comprising an elongated tubular light source disposed perpendicularly at the optical center of the reflector.
Figure 24:
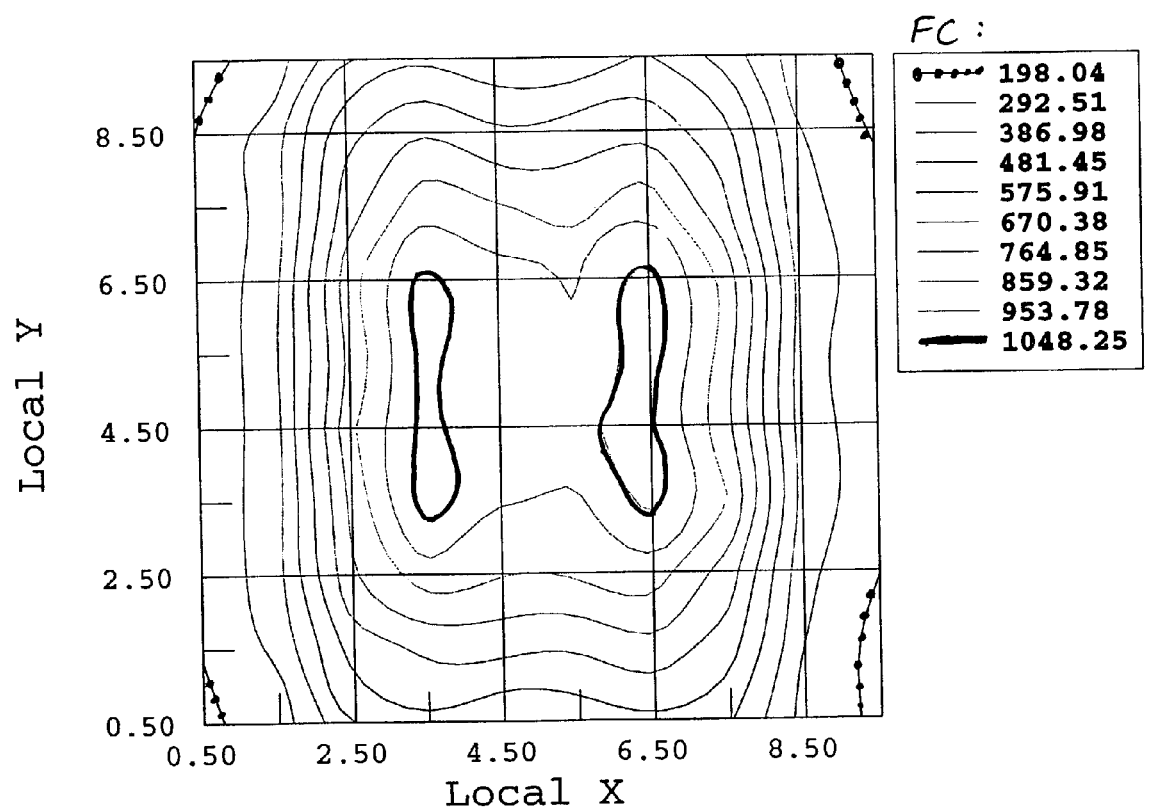
FIG. 24 shows an illuminance iso-contour plot for the improved lighting apparatus as described in FIG. 22 comprising an elongated tubular light source disposed perpendicularly at the optical center of the reflector.

FIGS. 23 and 24 illustrates the light distribution characteristics of the elongated light reflector of the lighting apparatus as described in FIG. 22.

Referring to FIG. 23, the 0°/Long line is substantially semi-circular showing a peak luminous intensity of 28000 Candela at 0° longitudinally and 0° latitudinally which gradually decreases as one moves from looking at the elongated light source from directly underneath the elongated reflector means towards a front elevational view until about 60° where luminous intensity decreases relatively sharply to zero. The relative smoothness of this 0°/Long polar plot is indicative of relative uniformity of light distributed along the longitudinal axis of the lighting apparatus. The 90°/Long line of the polar plot shows reasonable distribution of light for up to about 20° to 25° but stepwise fluctuations are evident suggesting non-uniformity of light emissions.

FIG. 24 is an iso-contour plot for the lighting apparatus as described in FIG. 22 illustrating the classical "dual hot-spotting" as represented by the two parallel ovoid areas suffering from intense illumination sandwiching a central "shade" area and confirming non-uniformity of light emissions.

This again confirms the aforementioned adversity associated with the simple insertion of a V-shaped channel into a conventional elongated light reflector with a conic cross section without taking consideration of re-optimization of positioning, horizontally or vertically, of the elongated light source as taught by the present invention.

Figure 25:
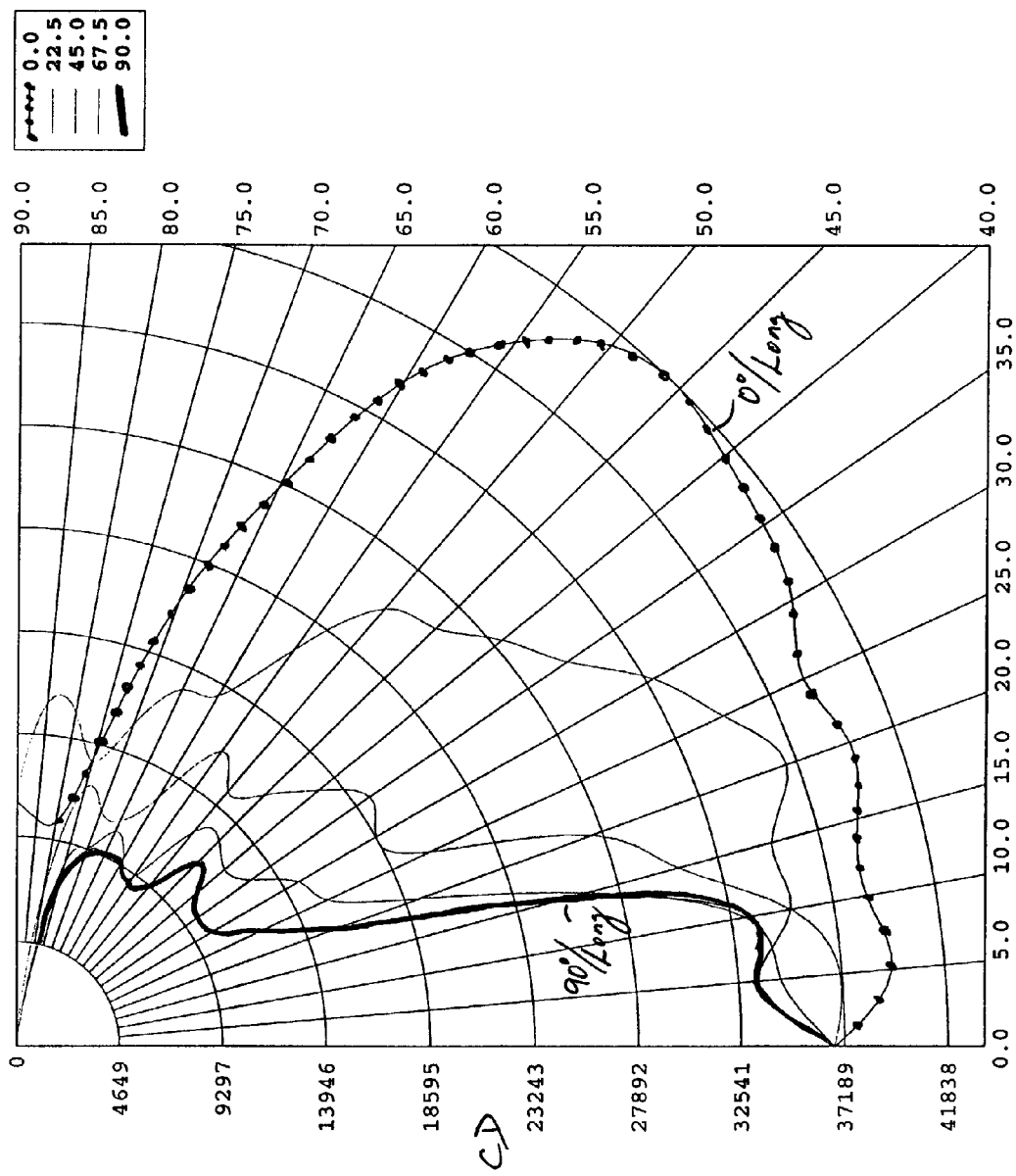
FIG. 25 shows a three-dimensional Candela distribution polar plot for the improved lighting apparatus as described in FIG. 8 comprising an elongated tubular light source disposed perpendicularly 2" beyond the optical center of the reflector.
Figure 26:
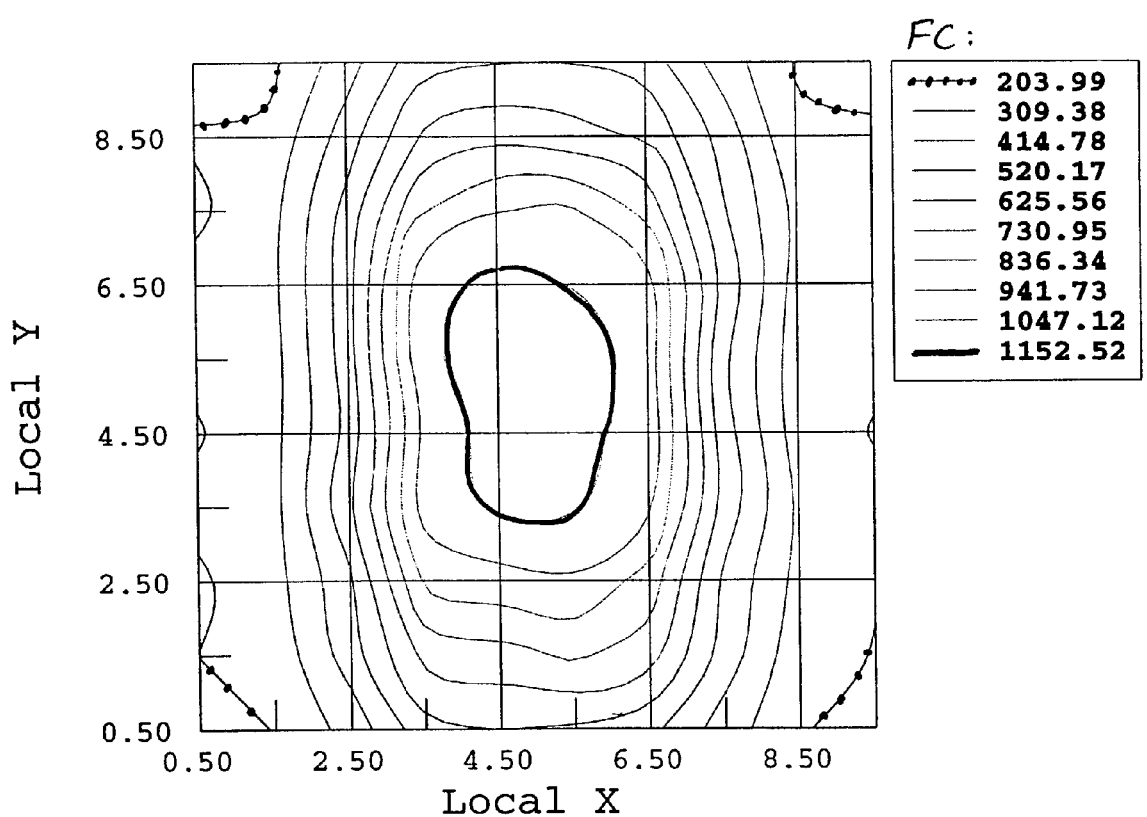
FIG. 26 shows an illuminance iso-contour plot for the improved lighting apparatus as described in FIG. 8 comprising an elongated tubular light source disposed perpendicularly 2" beyond the optical center of the reflector.

In order to provide support for the applicability of the present novel method of light source repositioning as taught herein to configurations other than horizontally disposed elongated light sources, FIGS. 25 and 26 illustrate the light distribution characteristics of the improved lighting apparatus as described in FIG. 8 comprising the same elongated reflector means with a parabolic cross section with a centrally disposed V-shape rib integral with the exception that the elongated light source is now positioned so that its geometric center 33 (in FIG. 8) is 2" beyond the optical center 32 of the elongated reflector means.

As evidently shown especially in FIG. 26, the repositioning of the light source according to the method of the present invention abolished the undesired "dual hot-spotting" phenomenon associated with the above which is replaced by a set of concentrically arranged iso-contour rings indicating a substantially uni-modal normal distribution of light emitted from the lighting apparatus.

As noted above, this normalization of light distribution from the improved lighting apparati of the present invention is preferred for providing more uniform and predictable lighting for a given target placed under each improved lighting apparatus and it is also a prerequisite for the specific positioning of a plurality of improved lighting apparati to form the improved lighting arrays of the present invention.

With respect to the efficiency of the improved lighting apparati of the present invention, the inventor has again surprising confirmed that by optimizing the positioning of the elongated light source as above, the efficiency of light output is also improved as compared to conventional parabolic lighting apparati with the V-shape rib integrals.

Referring to Table 3 below, it is evident that the amount of light being reflected more than twice by the lighting apparatus as well as the amount of light wasted through absorption by the lighting apparatus are both decreased substantially by moving the vertically disposed elongated light source away from the optical center by 2".

TABLE 3

Efficiency of Parabolic Lighting Apparati with a V-Shape Rib Integral and a Vertically Disposed Elongated Light Source

| Apparatus Configuration/ position of light source beyond optical center | % Light exiting apparatus after 0 reflection off reflector | % Light exiting apparatus after 1 reflection off reflector | % Light exiting apparatus after 2 reflections off reflector | % Light absorbed by apparatus |
|---|---|---|---|---|
| Parabolic/0" (FIG. 22) | 37.0 | 44.5 | 9.6 | 4.8 |
| Parabolic/2" (FIG. 8) | 40.2 | 43.8 | 6.6 | 4.3 |
| Parabolic/4" | 43.5 | 41.8 | 4.6 | 3.8 |

Light Source: 1000 W M47 metal halide MH1000 lamp with a BT-37 ovoid bulb

Figure 27:
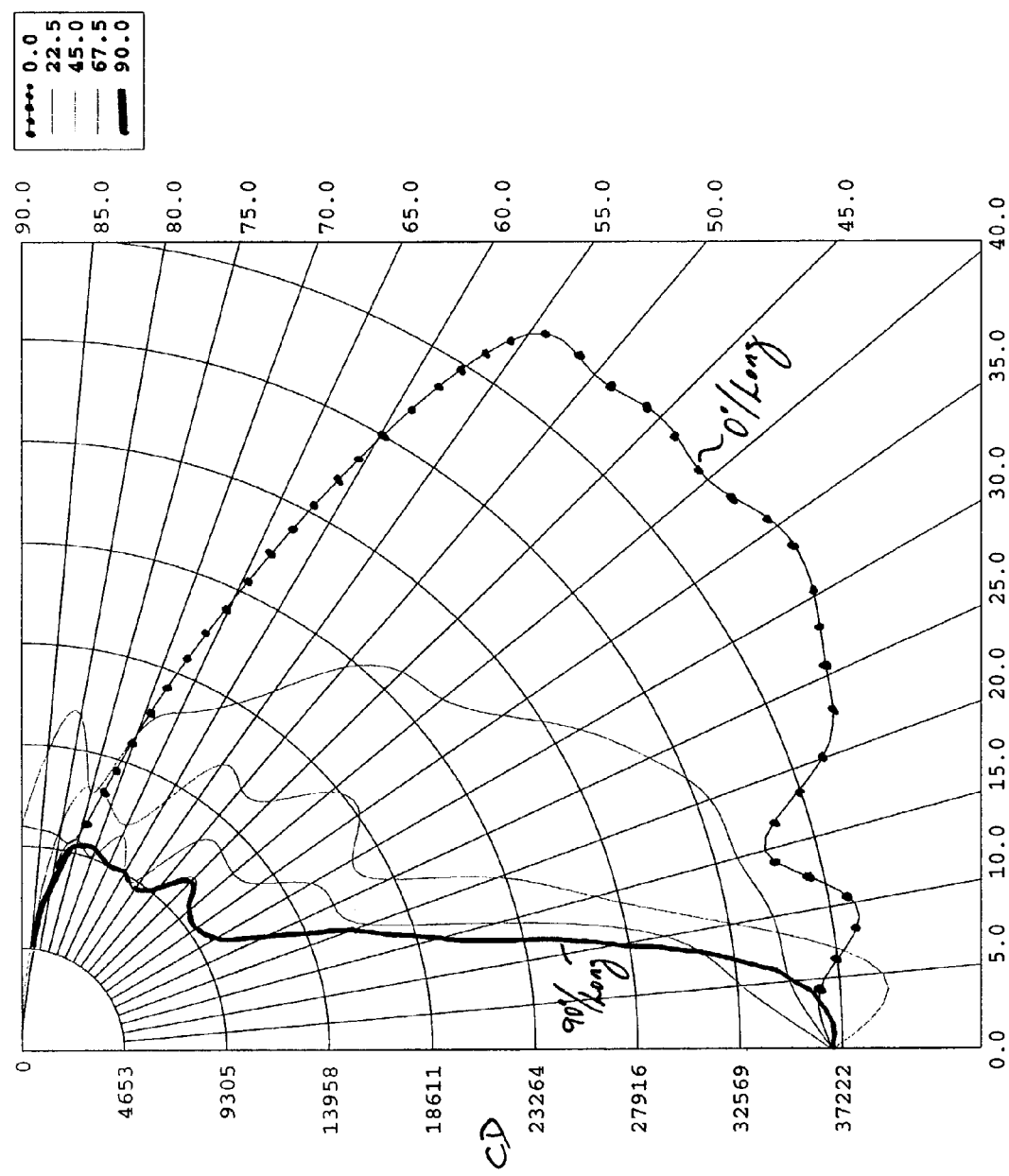
FIG. 27 shows a three-dimensional Candela distribution polar plot for the improved lighting apparatus as described in FIG. 8 comprising an elongated tubular light source disposed perpendicularly 4" beyond the optical center of the reflector.
Figure 28:
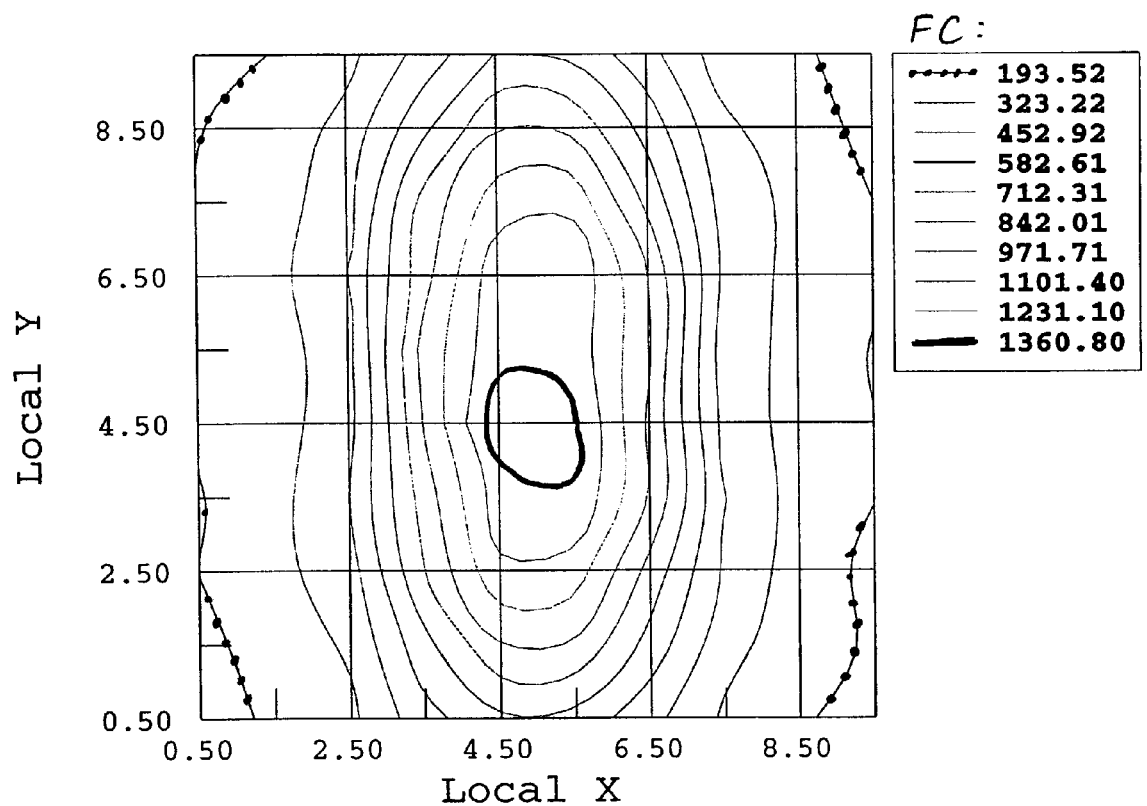
FIG. 28 shows an illuminance iso-contour plot for the improved lighting apparatus as described in FIG. 8 comprising an elongated tubular light source disposed perpendicularly 4" beyond the optical center of the reflector.

For the purpose of comparison, data on the effects of further lowing of the geometric center of the elongated light source to 4" beyond the optical center of the elongated reflector means are also presented in Table 3 and in FIGS. 27 and 28. This additional increase in distance between same further improved efficiency while retaining uniformity of light distribution as shown in the illuminance iso-contour plot in FIG. 28.

The increase in efficiency is also observable from and is confirmed by the iso-contour plots in FIGS. 26 and 28 as compared to FIG. 24 in that while the highest light intensity observed with the elongated lighting apparatus of FIG. 22 (as indicated by the highest value iso-contour ring in FIG. 24) is about 1050 FC, the highest light intensities observed with the other two improved lighting apparati as shown in Table 3 above are about 1150 and about 1360, respectively.

It is important to note that, as aforementioned, this extra separation between the geometric center of the elongated light source and the optical center of the elongated reflector means also resulted in a slight reduction in the breadth of light distribution as shown in FIG. 27, and that preferably, the geometric center of the elongated light source should again remain within the bounds of the elongated reflector means and should not be repositioned to the extent that a substantial portion of the elongated light source is exposed past the side edges of the elongated reflector means.

Example 5

Light Distribution from a Parabolic Apparatus of the Present Invention with a Vertically Disposed Elongated Light Source but without a Central V-Shape Rib Integral The present example illustrates light quality data for an improved lighting apparatus comprising a novel, vertical, positioning of an elongated light source.

With reference to FIGS. 5 to 7, the present improved lighting apparatus comprises a conventional reflector means having a substantially parabolic cross section and an elongated light source disposed in an unconventional and novel manner in that the longitudinal axis of the elongated light source is disposed substantially perpendicularly to the directrix of the parabolic cross section of the elongated reflector means. It is important to note that in contrast to the setups as described in Example 4 above, the improved lighting apparati hereunder do not include central V-shape rib integrals.

Figure 29:
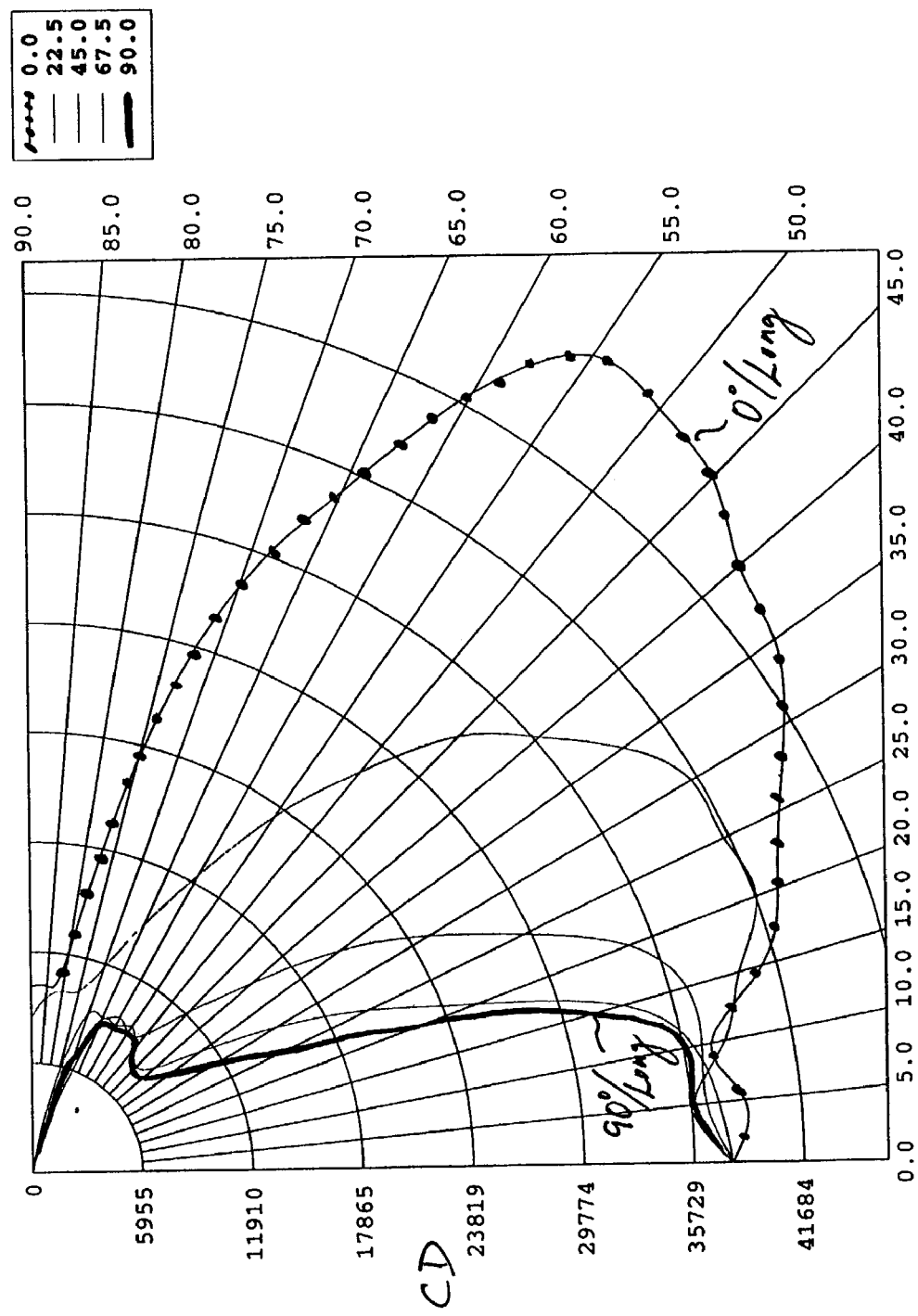
FIG. 29 shows a three-dimensional Candela distribution polar plot for the improved lighting apparatus in FIGS. 5 to 7 comprising an elongated tubular light source disposed perpendicularly at the optical center of the reflector.
Figure 30:
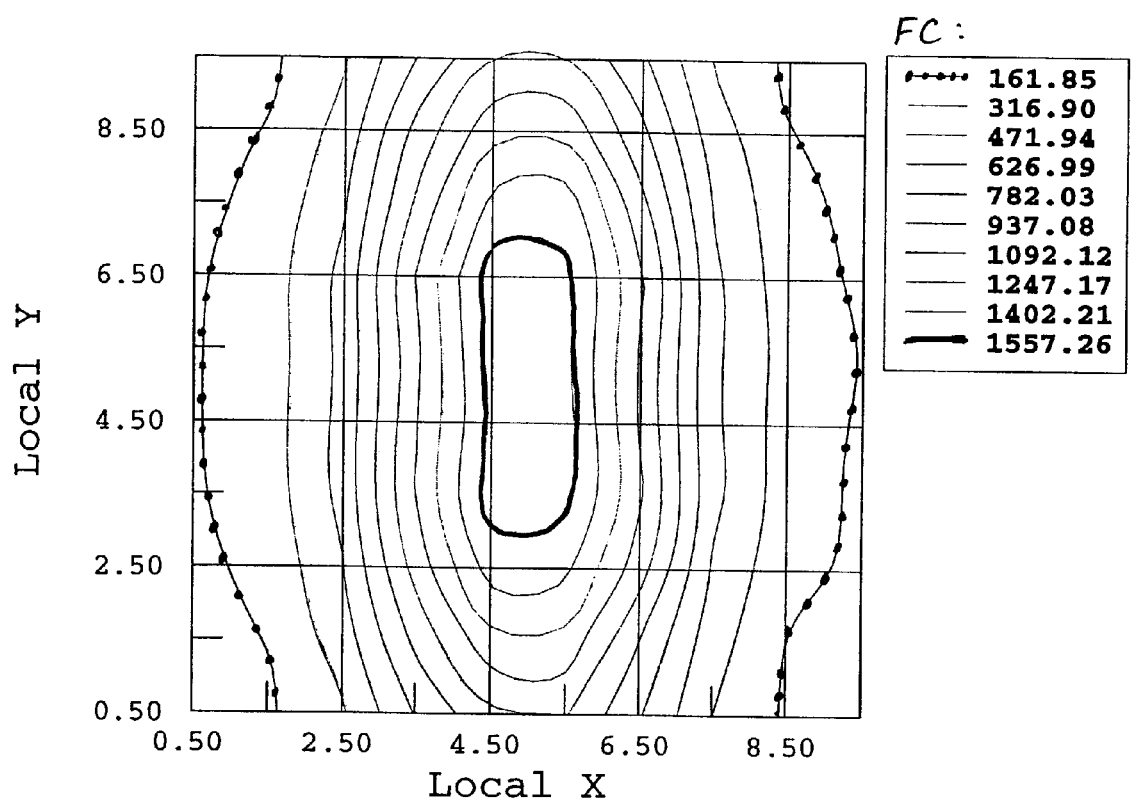
FIG. 30 shows an illuminance iso-contour plot for the improved lighting apparatus as described in FIGS. 5 to 7 comprising an elongated tubular light source disposed perpendicularly at the optical center of the reflector.
Figure 31:
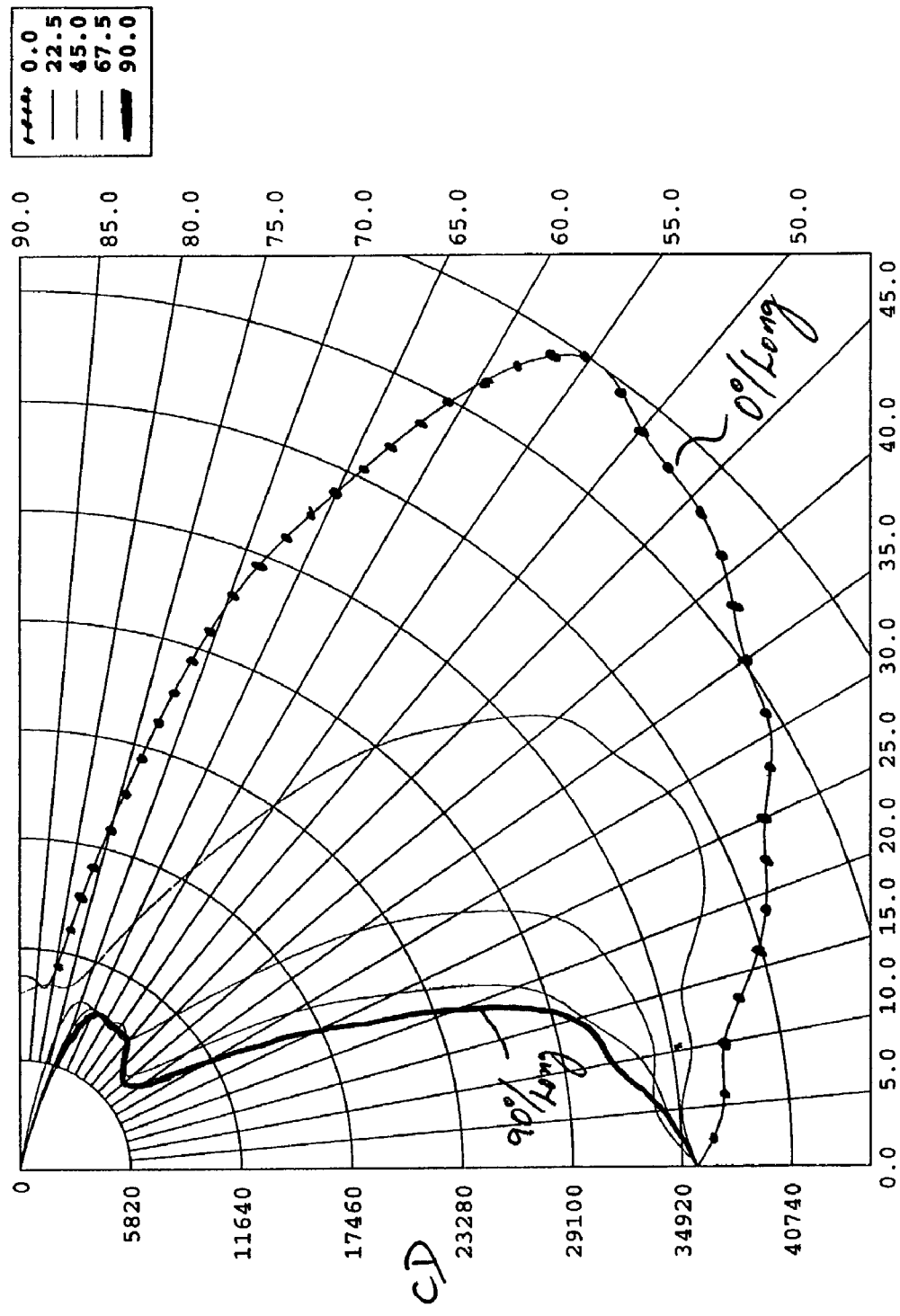
FIG. 31 shows a three-dimensional Candela distribution polar plot for the improved lighting apparatus in FIGS. 5 to 7 comprising an elongated tubular light source disposed perpendicularly 1" beyond the optical center of the reflector.
Figure 32:
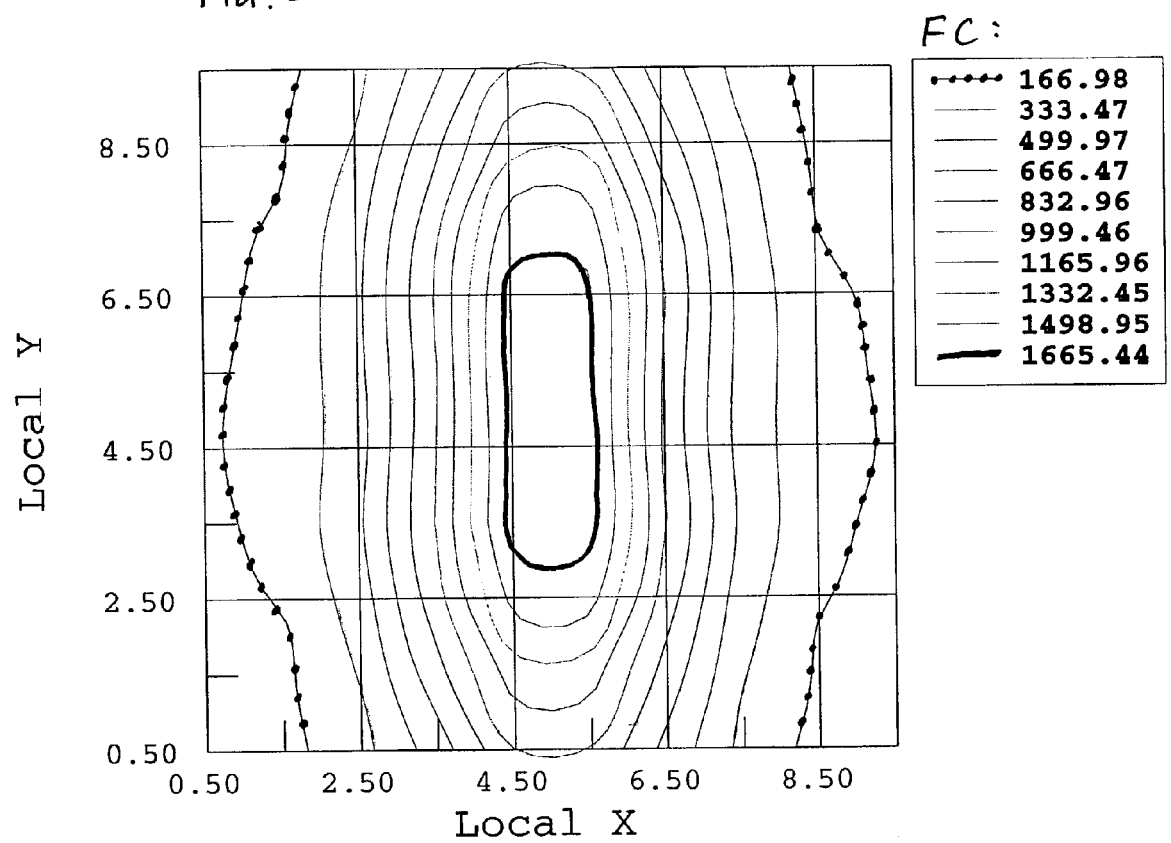
FIG. 32 shows an illuminance iso-contour plot for the improved lighting apparatus as described in FIGS. 5 to 7 comprising an elongated tubular light source disposed perpendicularly 1" beyond the optical center of the reflector.
Figure 33:
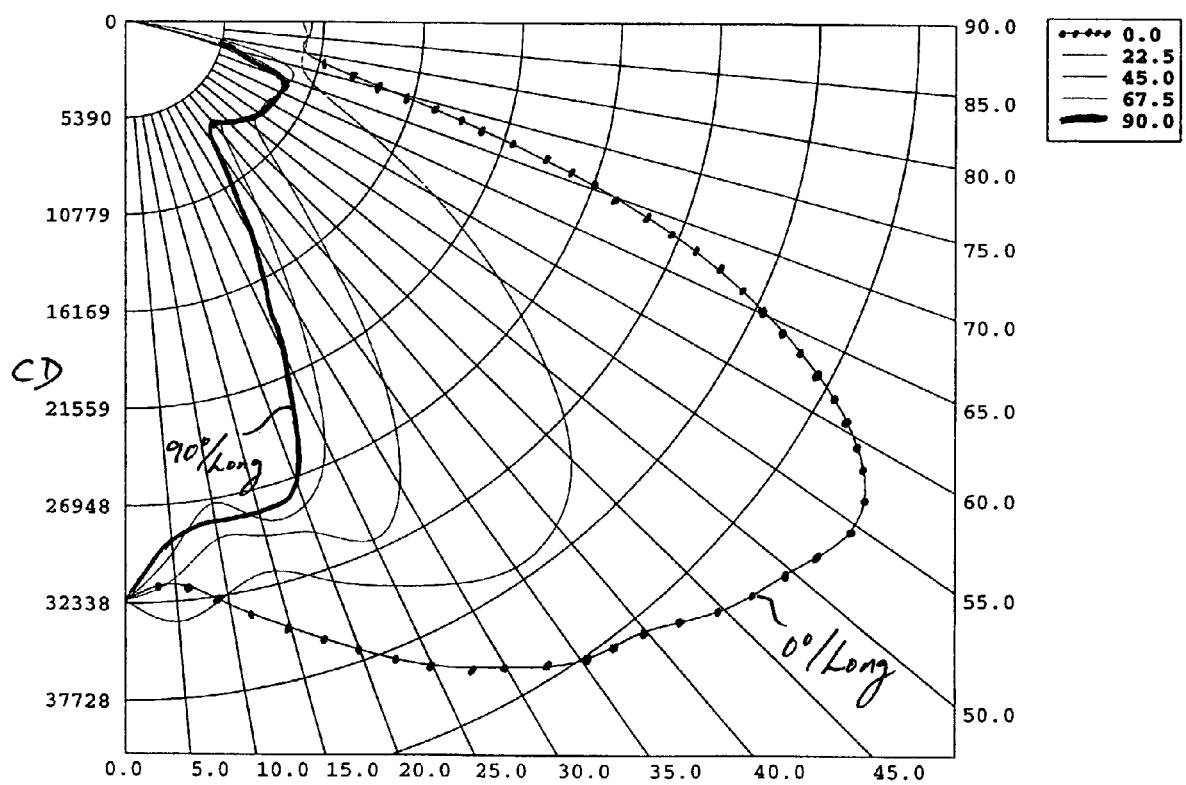
FIG. 33 shows a three-dimensional Candela distribution polar plot for the improved lighting apparatus in FIGS. 5 to 7 comprising an elongated tubular light source disposed perpendicularly 2" beyond the optical center of the reflector.
Figure 34:
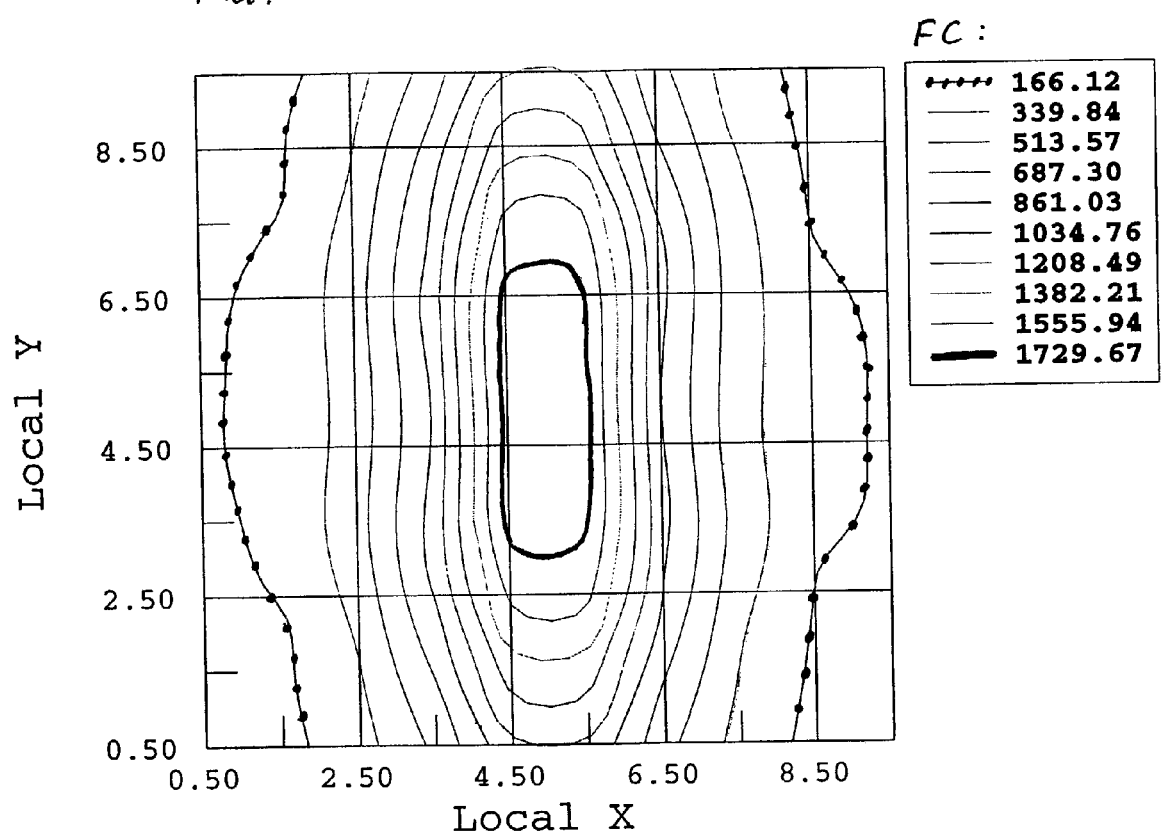
FIG. 34 shows an illuminance iso-contour plot for the improved lighting apparatus as described in FIGS. 5 to 7 comprising an elongated tubular light source disposed perpendicularly 2" beyond the optical center of the reflector.

FIGS. 29 and 30 illustrate Candela polar plot and illuminance iso-contour plot data for an improved apparatus comprising an elongated light source disposed perpendicularly to the elongated reflector means in a manner that its geometric center is at the optical center of the elongated reflector means, FIGS. 31 and 32 illustrate data for same except that the geometric center of the elongated light source is 1" beyond the optical center of the elongated reflector means, and FIGS. 33 and 34 illustrate data for same except that the geometric center of the elongated light source is 2" beyond the optical center of the elongated reflector means.

As evidenced by the relatively semi-circular Candela polar plots and the concentrically arranged iso-contour rings, FIGS. 29 to 34 all indicate relatively uniform, unimodal, distribution of light emitted from the elongated light sources when disposed perpendicularly in the present elongated reflector means without the V-shape rib integrals.

It is surprising to note that the longitudinal distribution of light emitted from a single perpendicularly disposed elongated light source at the center of the elongated reflector means, as indicated by the 0°/Long polar plots, is as broad as, if not is better than the longitudinal distribution of light emitted from a horizontally disposed elongated light source spanning a greater proportion of the elongated reflector means.

It is also surprising to learn that the lighting efficiency of the present setup is further improved as compared to even an improved lighting apparatus that has a V-shape rib integral and the positioning of the horizontally disposed light source optimized as described above. Parameters of particular interest in Table 4 include the very low percentages of light exiting the lighting apparatus after 2 reflections and the low percentages of light absorbed by the lighting apparatus 2.

TABLE 4

Efficiency of Parabolic Lighting Apparati without any V-Shape Rib Integral and a Vertically Disposed Elongated Light Source

| Apparatus Configuration/position of light source beyond optical center | % Light exiting apparatus after 0 reflection off reflector | % Light exiting apparatus after 1 reflection off reflector | % Light exiting apparatus after 2 reflections off reflector | % Light absorbed by apparatus |
|---|---|---|---|---|
| Light Source: 1000 W M47 metal halide MH1000 lamp with a BT-37 ovoid bulb - Perpendicular | | | | |
| 5 | 35.6 | 56.1 | 0.1 | 3.7 |
| 5 | 37.2 | 53.9 | 0.1 | 3.5 |
| 5 | 38.8 | 51.8 | 0.1 | 3.3 |
| 5 | | | | |
| 5 | 34.7 | 55.9 | 0.3 | 3.7 |
| Parabolic/1" (FIG. 5) | 36.2 | 53.9 | 0.3 | 3.5 |
| Parabolic/2" (FIG. 5) | 37.7 | 51.9 | 0.2 | 3.4 |
| Light Source: 1000 W 250V S52 high pressure sodium LU1000 lamp with E-25 tubular bulb - Horizontal | | | | |
| Parabolic +/0"(FIG. 11) | 41.1 | 39.6 | 12.2 | 5.1 |
| Parabolic + V/2"(FIG. 4) | 44.1 | 39.3 | 8.9 | 4.6 |
| Parabolic + V/4" | 47.0 | 38.6 | 6.7 | 4.0 |

It should be noted that although the data presented in this example are based on the 1000 W M47 metal halide MH1000 lamp with a BT-37 ovoid bulb, the aforementioned benefits are not specific to this bulb design as the inventor has obtained very similar results with, for example, a BT-56 bulb of different dimensions.

In summary, the presently novel combination of the perpendicular positioning of a single bulb in a conventional parabolic elongated reflector means can provide efficient and uniform lighting with broad distribution that are comparable, if not superior, to the more conventional lighting apparati, even with the V-shape rib integrals and corresponding repositioning of the light sources as taught hereinabove.

Having illustrated and described the principles of the invention in a preferred embodiment, it should be appreciated to those skilled in the art that the invention can be modified in arrangement and detail without departure from such principles. All modifications coming within the scope of the following claims are to be claimed.

All publications, patents and patent applications referred to herein are incorporated by reference in their entirety to the same extent as if each individual publication, patent or patent application was specifically and individually indicated to be incorporated by reference in its entirety.

What is claimed is:

1. A lighting apparatus for providing substantially uniform light distribution, the apparatus comprising:
   an elongate reflector housing with an inner surface having a substantially constant profile in cross section which is generally concave, an optical center being defined at a geometric focus of the profile of the inner surface;
   at least one light source positioned within the elongate reflector housing, said at least one light source having a geometric center situated spaced outwardly from the optical center in a direction away from the inner surface of the elongate reflector housing; and
   at least one rib member extending in a substantially longitudinal direction of the elongate reflector housing and projecting from the inner surface of the elongate reflector housing generally towards the light source.

2. The apparatus according to claim 1 wherein said at least one light source is substantially centered laterally within the housing.

3. The apparatus according to claim 1 wherein said at least one rib member generally has a V-shaped cross section.

4. The apparatus according to claim 1 wherein said at least one light source is elongate having a length equal to or less than that of the housing and is oriented to extend substantially in a longitudinal direction of the housing substantially parallel to the housing.

5. The apparatus according to claim 1 wherein an outer periphery of said at least one light source is spaced outwardly from the optical center of the housing.

6. The apparatus according to claim 1 wherein the housing includes a longitudinally extending base and a pair of opposing sides spanning from the base to respective free ends thereof and wherein the geometric center of said at least one light source is spaced outwardly beyond the optical center of the housing a distance of between approximately 7 percent and 60 percent of a depth of the housing between the base and the free ends thereof.

7. The apparatus according to claim 1 wherein said at least one light source is spaced outwardly from the optical center of the housing and wherein the profile of the inner surface in cross section is substantially a section of a conic section.

8. The apparatus according to claim 1 wherein the housing includes a longitudinally extending base and a pair of opposing sides spanning from the base to respective free ends thereof, said at least one light source being substantially contained within a boundary of the housing defined between the base and the free ends of the housing.

9. The apparatus according to claim 1 wherein at least one tight source is a high intensity discharge light source.

10. The apparatus according to claim 1 wherein there is provided a plurality of light sources and each is independently selected from the group consisting of a mercury vapour light source, a metal halide light source, a high pressure sodium light source, and a low pressure sodium light source.

11. The apparatus according to claim 1 wherein the profile of the inner surface in cross section is substantially a section of a parabola.

12. The apparatus according to claim 1 wherein the profile of the inner surface in cross section is substantially a section of an ellipse.

13. A method of providing substantially uniform illumination comprising:
providing at least one elongate reflector housing, said at least one housing including an inner surface having a substantially constant profile in cross section which is generally concave, an optical center being defined at a geometric focus of the profile of the inner surface;
providing at least one light source positioned within said at least one elongate reflector housing, said at least one light source having a geometric center situated spaced outwardly from the optical center, away from the inner surface of Bald at least one elongate reflector housing; and
providing at least one rib member extending in a substantially longitudinal direction of the elongate reflector housing and projecting from the inner surface of the elongate reflector housing generally towards the light source.

14. The method according to claim 13 including orienting said at least one reflector housing such that the inner surface generally faces downward above a target illumination area and illuminating a target illumination area for an application requiring substantially uniform illumination.

15. The method according to claim 13 including forming said at least one reflector housing and positioning said at least one light source contained therein to absorb less than 5 percent of light emitted from said at least one light source.

16. A lighting apparatus for providing substantially uniform light distribution, the apparatus comprising:
an elongate reflector housing with an inner surface having a substantially constant profile in cross section which is generally concave, an optical center being defined at a geometric focus of the profile of the inner surface, the housing including a longitudinally extending base and a pair of opposing sides spanning from the base to respective free ends thereof; and
at least one elongate high intensity discharge light source positioned within the elongate reflector housing such that a longitudinal axis of the light source lies substantially perpendicular to a longitudinal direction of the housing and extends through the optical center of the housing with a geometric center of the light source being spaced from the optical center away from the inner surface of the housing by a distance of between approximately 7 percent and 60 percent of a depth of the housing between the base and the free ends thereof.

17. The apparatus according to claim 16 wherein the at least one light source is substantially centered laterally within the housing.

18. The apparatus according to claim 16 wherein the profile of the inner surface in cross section is substantially a section of a conic section.

19. The apparatus according to claim 16 wherein the profile of the inner surface in cross section is substantially a section of a parabola.

20. The apparatus according to claim 16 wherein the at least one light source is a metal halide light source.

21. A lighting apparatus for providing substantially uniform light distribution, the apparatus comprising:
an elongate reflector housing with an inner surface having a substantially constant profile in cross section which is generally concave and formed of a plurality of sequentially adjacent elongate rectangular sections, each section being oriented at an obtuse angle relative to respective adjacent sections, an optical center being defined at a geometric focus of the profile of the inner surface; and
at least one elongate high intensity discharge light source positioned within the elongate reflector housing such that a longitudinal axis of the light source lies substantially perpendicular to a longitudinal direction of the housing and extends through the optical center of the housing with a geometric center of the light source being spaced from the optical center away from the inner surface of the housing.

22. The apparatus according to claim 21 wherein the at least one light source is substantially centered laterally within the housing.

23. The apparatus according to claim 21 wherein the profile of the inner surface in cross section is substantially a section of a conic section.

24. The apparatus according to claim 21 wherein the profile of the inner surface in cross section is substantially a section of a parabola.

25. The apparatus according to claim 21 wherein the at least one light source is a metal halide light source.

26. A method of providing substantially uniform illumination to a target area, the method comprising:
providing at least one lighting apparatus comprising an elongate reflector housing with an inner surface having a substantially constant profile in cross section which is generally concave, an optical center being defined at a geometric focus of the profile of the inner surface, the housing including a longitudinally extending base and a pair of opposing sides spanning form the base to respective fee ends thereof; and at least one elongate high intensity discharge light source positioned within the elongate reflector housing such that a longitudinal axis of the light source lies substantially perpendicular to a longitudinal direction of the housing and extends through the optical center of the housing with a geometric center of the light source being spaced from the optical center away from the inner surface of the housing by a distance of between approximately 7 percent and 60 percent of a depth of the housing between the base and the free ends thereof; and
supporting said at least one lighting apparatus above the target area.

27. A method of providing substantially uniform illumination to a target area, the method comprising:
providing at least one lighting apparatus comprising:
an elongate reflector housing with an inner surface having a substantially constant profile in cross section which is generally concave and formed of a plurality of sequentially adjacent elongate rectangular sections, each section being oriented at an obtuse angle relative to respective adjacent sections, an optical center being defined at a geometric focus of the profile of the inner surface; and
at least one elongate high intensity discharge light source positioned within the elongate reflector housing such that a longitudinal axis of the light source lies substantially perpendicular to a longitudinal direction of the housing and extends through the optical center of the housing with a geometric center of the light source being spaced from the optical center away from the inner surface of the housing; and
supporting said at least one lighting apparatus above the target area.

* * * * *